United States Patent
Li et al.

(10) Patent No.: US 11,204,684 B2
(45) Date of Patent: Dec. 21, 2021

(54) STICKER PRESENTATION METHOD AND APPARATUS AND COMPUTER-READABLE STORAGE MEDIUM

(71) Applicant: Tencent Technology (Shenzhen) Company Limited, Shenzhen (CN)

(72) Inventors: Shaofeng Li, Shenzhen (CN); Hao Wu, Shenzhen (CN); Minghao Zhu, Shenzhen (CN); Xiaoming Yang, Shenzhen (CN); Yucong Chen, Shenzhen (CN); Zhenpeng Ye, Shenzhen (CN); Shaozu Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 25 days.

(21) Appl. No.: 16/569,515

(22) Filed: Sep. 12, 2019

(65) Prior Publication Data

US 2020/0004394 A1 Jan. 2, 2020

Related U.S. Application Data

(63) Continuation of application No. PCT/CN2018/096609, filed on Jul. 23, 2018.

(30) Foreign Application Priority Data

Jul. 31, 2017 (CN) .......................... 201710639778.0

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0486* (2013.01); *G06F 3/04845* (2013.01); *H04L 12/1813* (2013.01); *H04L 51/32* (2013.01)

(58) Field of Classification Search
CPC .... G06F 3/0481; G06F 3/0482; G06F 3/0484; G06F 3/04845; G06F 3/0486;
(Continued)

(56) References Cited

U.S. PATENT DOCUMENTS

2008/0163074 A1 7/2008 Tu
2009/0070695 A1* 3/2009 Oh .................... G06F 3/0486
715/769

(Continued)

FOREIGN PATENT DOCUMENTS

CN 101252549 A 8/2008
CN 104932853 A 9/2015
(Continued)

OTHER PUBLICATIONS

Tencent Technology, ISRWO, PCT/CN2018/096609, Oct. 11, 2018, 7 pgs.
(Continued)

*Primary Examiner* — Jennifer N Welch
*Assistant Examiner* — Reji Kartholy
(74) *Attorney, Agent, or Firm* — Morgan, Lewis & Bockius LLP

(57) ABSTRACT

Embodiments of this application disclose a sticker presentation method performed at a first terminal. The first terminal moves, after obtaining a drag instruction for a selected target sticker in a sticker selection window, the target sticker according to an obtained drag track, and displays a drop prompt message when moving the target sticker. After obtaining a drag stop instruction for the target sticker in a message presentation interface, the first terminal presents
(Continued)

the target sticker at a first target location at which drag stops after receiving a drop confirmation instruction triggered by the drop prompt message. In the embodiments of this application, when a sticker is presented, the sticker is randomly dropped on a message presentation interface. Such a sticker presentation manner is more vivid, interaction manners are more diversified, and a display effect is good.

18 Claims, 25 Drawing Sheets

(51) Int. Cl.
*G06F 3/0486* (2013.01)
*H04L 12/18* (2006.01)
*H04L 12/58* (2006.01)

(58) Field of Classification Search
CPC . G06F 3/04883; H04L 12/1813; H04L 51/10; H04L 51/32
See application file for complete search history.

(56) References Cited

U.S. PATENT DOCUMENTS

| | | | |
|---|---|---|---|
| 2010/0125785 A1 | 5/2010 | Moore et al. | |
| 2010/0194763 A1* | 8/2010 | Niles | G06T 13/00 345/474 |
| 2013/0154980 A1* | 6/2013 | Byrnes | G06F 3/01 345/173 |
| 2014/0109046 A1* | 4/2014 | Hirsch | G06F 8/60 717/120 |
| 2015/0268780 A1 | 9/2015 | Kim et al. | |
| 2015/0277686 A1* | 10/2015 | LaForge | G11B 27/34 715/723 |
| 2015/0309720 A1* | 10/2015 | Fisher | G06F 3/04842 715/752 |
| 2016/0011775 A1* | 1/2016 | Guo | G06F 3/0486 715/765 |
| 2016/0259526 A1* | 9/2016 | Lee | H04L 51/10 |
| 2017/0153792 A1* | 6/2017 | Kapoor | G06F 3/0486 |
| 2017/0359701 A1* | 12/2017 | Sarma | H04L 51/063 |

FOREIGN PATENT DOCUMENTS

| | | |
|---|---|---|
| CN | 105389114 A | 3/2016 |
| CN | 105487770 A | 4/2016 |
| CN | 105930828 A | 9/2016 |
| CN | 106888153 A | 6/2017 |
| CN | 107479784 A | 12/2017 |

OTHER PUBLICATIONS

Tencent Technology, IPRP, PCT/CN2018/096609, Feb. 4, 2020, 5 pgs.
Drew Moxon, "Introducing Message Reactions and Mentions for Messenger", Mar. 23, 2017, 12 pgs., Retrieved from the Internet: https://about.fb.com/news/2017/03/introducing-message-reactions-and-mentions-formessenger/.
iGeeksBlog, "How to React, Change, Remove Emoji Tapbacks in Message in IOS 10", Jun. 29, 2016, 3 pgs., Retrieved from the Internet: https://www.youtube.com/watch?v=D9Cz0oRo6-o.

\* cited by examiner

US 11,204,684 B2

STICKER PRESENTATION METHOD AND APPARATUS AND COMPUTER-READABLE STORAGE MEDIUM

CROSS-REFERENCE TO RELATED APPLICATIONS

This application is a continuation application of PCT/CN2018/096609, entitled "STICKER PRESENTATION METHOD AND APPARATUS AND COMPUTER-READABLE STORAGE MEDIUM" filed on Jul. 23, 2018, which claims priority to Chinese Patent Application No. 201710639778.0, entitled "STICKER PRESENTATION METHOD AND APPARATUS AND COMPUTER-READABLE STORAGE MEDIUM" filed with the Chinese Patent Office on Jul. 31, 2017, both of which are incorporated by reference in their entirety.

FIELD OF THE TECHNOLOGY

Embodiments of this application relate to the field of Internet technologies, and in particular, to a sticker presentation method and apparatus and a computer-readable storage medium.

BACKGROUND OF THE DISCLOSURE

In the times of mobile Internet, depending on continuous development of social contact and networks, communication manners between people also correspondingly change, that is, change from communication through texts at the earliest time to starting gradually using some simple symbols and stickers, and then evolve into an increasingly diversified sticker culture step by step. In other words, stickers are a popular culture formed after social networking applications become active. For example, in a process in which a user interacts with a friend, to make two parties of interaction obtain good communication experience, this type of social networking application also supports a sticker presentation function. That is, any party participating in interaction may present a sticker to the opposite party of interaction on a message presentation interface.

In a related technology, when a sticker is presented, it is usually implemented by using the following manner: after detecting a click operation performed by one party of interaction on any sticker in a sticker selection window, a terminal displays a selected sticker on the message presentation interface according to a sequence. For example, if no message is currently presented on the message presentation interface, the terminal presents the sticker at a fixed first message presentation location on the message presentation interface. If messages are currently displayed on the message presentation interface, the terminal presents the sticker at a first message presentation location after these messages.

In the implementation process of embodiments of this application, the inventors find that the related technology has at least the following problem:

When the sticker is presented, the selected sticker can be only presented on the message presentation interface according to a sequence. Therefore, this sticker presentation manner lacks vividness, a manner is simple, and a display effect is poor.

SUMMARY

To resolve the problem in the existing technology, embodiments of this application provide a sticker presentation method and apparatus and a computer-readable storage medium. The technical solutions are as follows:

According to a first aspect, a sticker presentation method is applied to a first terminal having one or more processors and memory storing programs to be executed by the one or more processors, the method comprising:

displaying, by the first terminal, a group chat window between friends of a social networking application, the group chat window including a sticker selection window and a message presentation interface;

obtaining, by the first terminal, a drag instruction for a selected target sticker in the sticker selection window;

moving, by the first terminal, the target sticker according to an obtained drag track corresponding to the drag instruction;

displaying, by the first terminal, a drop prompt message in a process of moving the target sticker;

obtaining, by the first terminal, a drag stop instruction for the target sticker in a message presentation interface; and in response to the drag stop instruction, presenting, by the first terminal, the target sticker at first target location at which drag stops after receiving a drop confirmation instruction triggered by the drop prompt message.

According to a second aspect, a first terminal has one or more processors, memory coupled to the one or more processors and a plurality of programs stored in the memory that, when executed by the one or more processors, cause the first terminal to perform the aforementioned sticker presentation method.

According to a third aspect, a non-transitory computer readable storage medium stores a plurality of machine readable instructions in connection with a first terminal having one or more processors. The plurality of machine readable instructions, when executed by the one or more processors, cause the first terminal to perform the aforementioned sticker presentation method.

The technical solutions provided in the embodiments of this application bring about the following beneficial effects:

When a sticker is presented, a selected sticker drag operation is supported in a sticker selection window, and in a process of dragging and moving the sticker, the sticker is supported to be randomly dropped on a message presentation interface. Therefore, such a sticker presentation manner is more vivid, interaction manners are more diversified, and a display effect is good.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of the embodiments of this application clearer, the following further describes in detail implementations of this application with reference to the accompanying drawings.

Sticker: stickers are a popular culture formed after social networking applications become active and are used for expressing particular emotions, mainly thoughts and emotions in faces or postures. The stickers may be usually divided into symbol stickers, static picture stickers, animated stickers, and the like. For examples, stickers may use human faces expressing various emotions of humans as materials or use stars, quotations, comics and animation, movie screenshots, and the like that are currently popular as materials with a series of matching words added.

Message presentation interface (All In One, AIO): it is a message presentation interface provided in a social networking application, such as, a friend chat interface or a group chat interface, and is used for presenting stickers.

Random drop: stickers are supported to be dragged to a message presentation interface and may be randomly adhered to the message presentation interface even if text information or other stickers are displayed at a current location.

Implementation scenarios and a system architecture related to the sticker presentation method according to an embodiment of this application are briefly described in the following.

The sticker presentation method according to this embodiment of this application is mainly used for a friend interactive scenario or a group interactive scenario. Currently, in an interactive scenario, assuming that one party of interaction selects a sticker in a sticker selection window through a click operation, the selected sticker is presented on a message presentation interface of parties of interaction according to a sequence.

Figure 1:
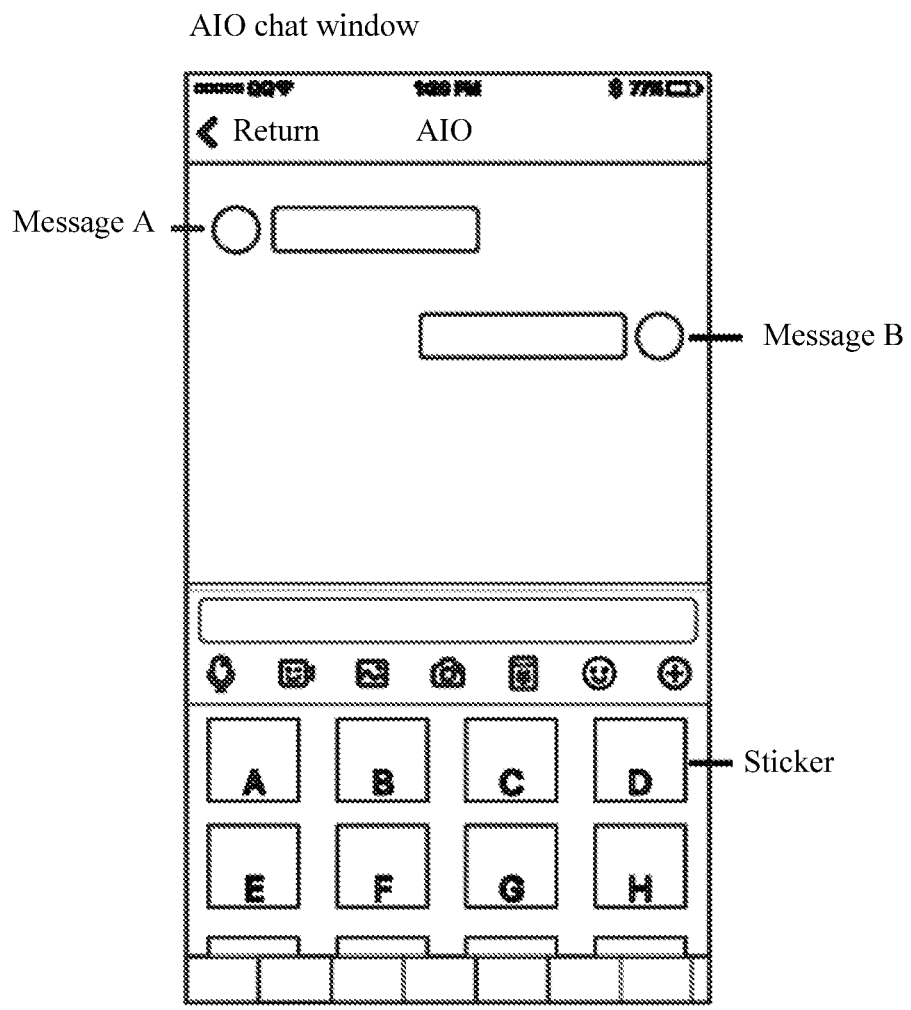
FIG. 1 is a schematic diagram of a message presentation interface according to an embodiment of this application.

For example, in FIG. 1, because a sending time of a sticker A is later than that of a sticker B, the sticker A is displayed before the sticker B. In addition, because the sticker A and the sticker B come from different users, for ease of distinguishing, the sent sticker A is presented by using a left side of the interface as a reference point in a manner of extending toward a longitudinal central axis, and the sent sticker B is presented by using a right side of the interface as a reference point in a manner of extending toward the longitudinal central axis.

Because such a sticker presentation manner is excessively simple and lacks vividness, it is provided in this embodiment of this application that a sticker can be dragged to the message presentation interface, may be randomly dropped on the message presentation interface, and can perform interaction manners of hiding and re-calling, so that a user can better express personal emotions in a process in which the user interacts with a friend from a friend relation chain, thereby enhancing emotional expression in an online non-face-to-face interaction situation, improving activity of the friend relation chain, increasing interaction pleasure, and providing better user experience.

Figure 2:
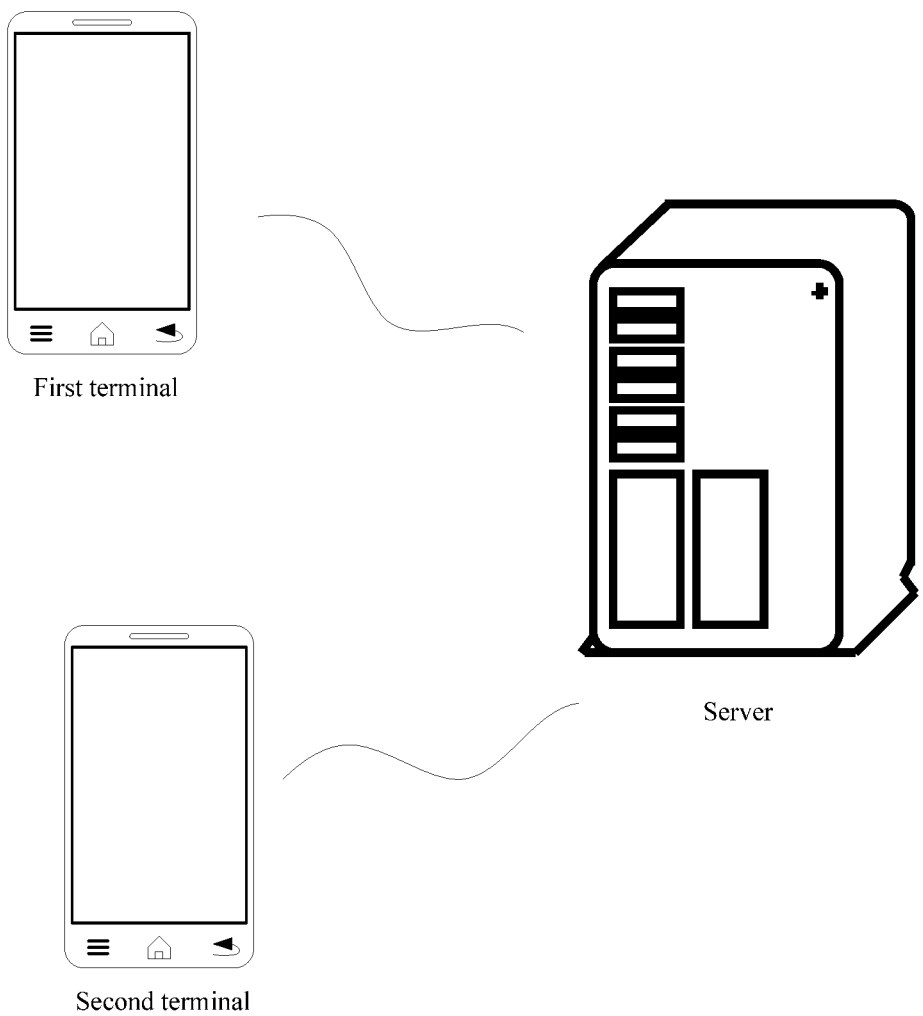
FIG. 2 is a diagram of a system architecture related to a sticker presentation method according to an embodiment of this application.

FIG. 2 is a diagram of a system architecture related to a sticker presentation method according to an embodiment of this application. Referring to FIG. 2, the system architecture includes a first terminal, a server, and a second terminal.

The first terminal and the second terminal may be smartphones, tablet computers, and the like. This is not specifically limited in this embodiment of this application. In a one-to-one interactive scenario, the second terminal includes one terminal. In a one-to-many interactive scenario, the second terminal includes a plurality of terminals. In addition, the same social networking application is installed on the first terminal and the second terminal. A first user of the first terminal and a second user of the second terminal perform interaction based on the social networking application, and the social networking application separately maintains a friend relation chain for the first user and the second user. The first user is located in a friend relation chain of the second user, and the second user is located in a friend relation chain of the first user.

In this embodiment of this application, a sticker presentation process may be briefly described as: moving, by a first terminal, after obtaining a drag instruction for a selected target sticker in a sticker selection window, the target sticker according to an obtained drag track; displaying a drop prompt message for the target sticker; and then if the first terminal obtains a drag stop instruction for the target sticker in a message presentation interface, in response to the drag stop instruction, presenting the target sticker at a first target location at which drag stops after receiving a drop confirmation instruction triggered by the drop prompt message.

The first target location may be any location on the message presentation interface even if text information or another sticker is displayed at the location. Certainly, the first terminal sends related sticker presentation data to the second terminal through transparent transmission of the server, so that the second terminal has the same sticker presentation effect as the first terminal.

In this way, an interaction manner of dragging a sticker to the message presentation interface for random drop through a trigger operation such as long press is implemented. In other words, in this embodiment of this application, a new sticker interaction manner is provided by sensing a gesture operation of the user. Refer to the following embodiment for detailed implementations of a drag trigger operation, random drop, hiding the sticker, and calling the sticker.

Figure 3:
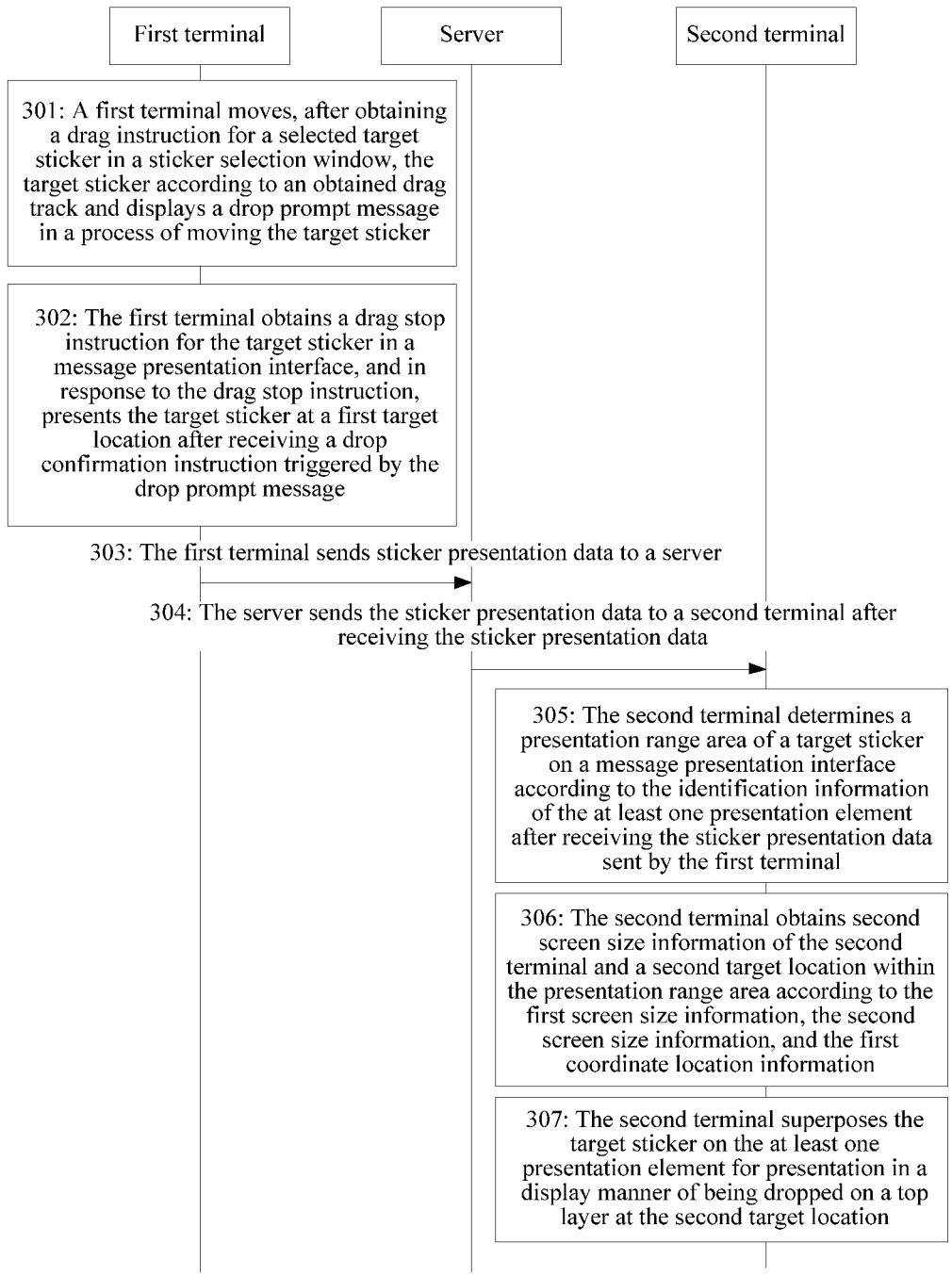
FIG. 3 is a flowchart of a sticker presentation method according to an embodiment of this application.

FIG. 3 is a flowchart of a sticker presentation method according to an embodiment of this application. Referring to FIG. 3, a method process provided in this embodiment of this application includes:

301: A first terminal moves, after obtaining a drag instruction for a selected target sticker in a sticker selection window, the target sticker according to an obtained drag track and displays a drop prompt message in a process of moving the target sticker.

Figure 4A:
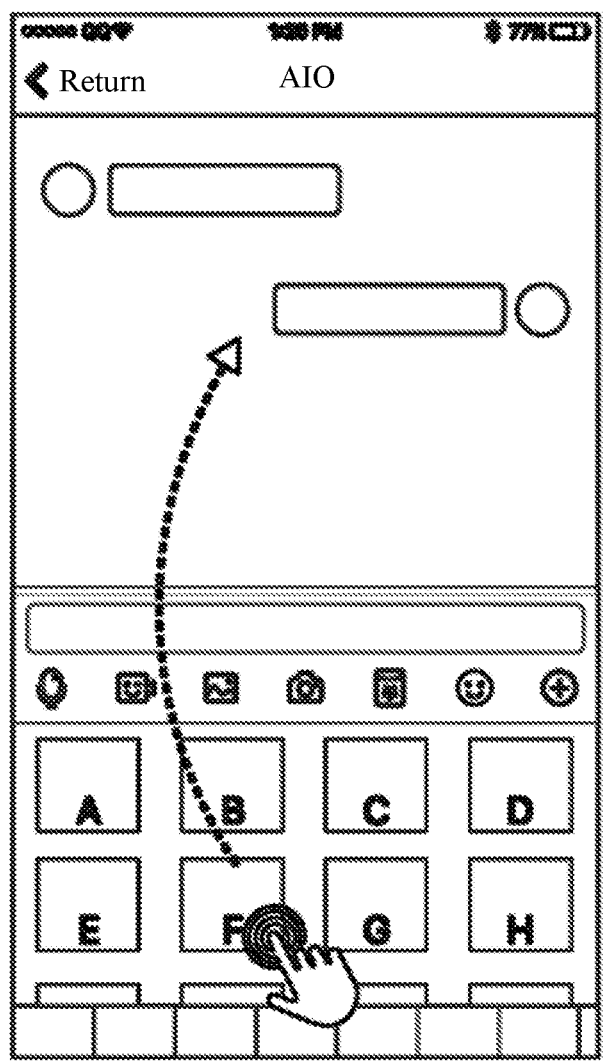
FIG. 4A is a schematic diagram of another message presentation interface according to an embodiment of this application.

The sticker selection window is used for presenting a plurality of different stickers, for the user to input a sticker. In this embodiment of this application, referring to FIG. 4A, if the first terminal detects that the first user triggers a long-press operation for a sticker F in the sticker selection window, the first terminal determines the sticker F as the target sticker. In the following, if the first terminal detects that the first user starts to perform a slide operation from the location, the first terminal determines obtaining a drag instruction for the sticker F and obtains a drag track formed by the slide operation in real time, to move the sticker F according to the drag track.

Figure 4B:
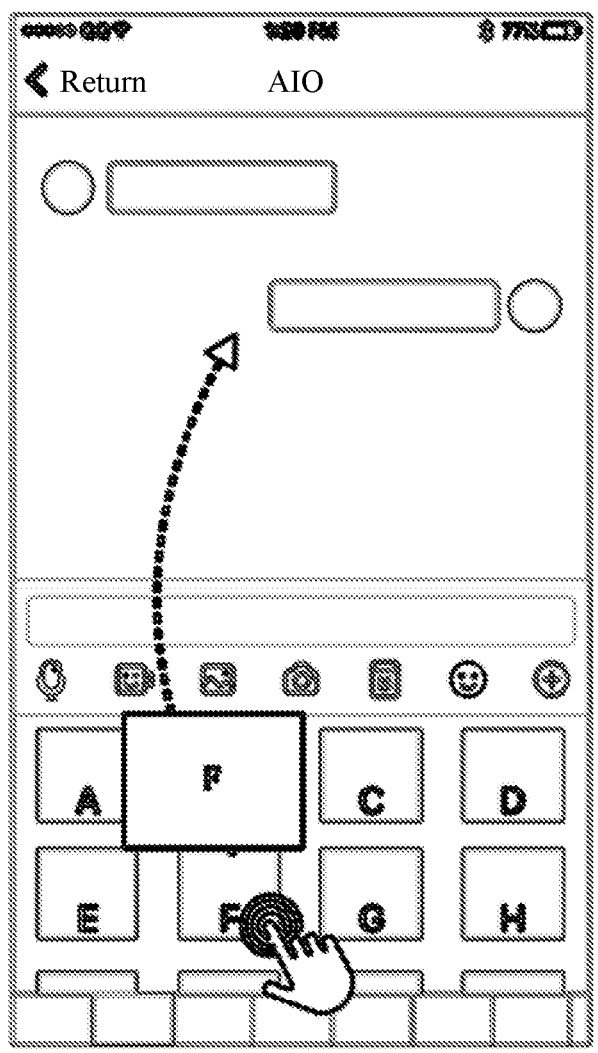
FIG. 4B is a schematic diagram of another message presentation interface according to an embodiment of this application.

Duration of the long-press operation may be 1s, 2s, or the like and is not specifically limited in this embodiment of this application. The duration of the long-press operation is distinguished from a single click operation. The drag track may be obtained by a touch-sensitive element on the first terminal. This is not specifically limited in this embodiment of this application. In addition, after the first terminal detects the long-press operation of the first user on the sticker F, to subsequently help the first user perform a drag operation on the sticker F, as shown in FIG. 4B, the first terminal may display an enlarged sticker F in a peripheral area of the sticker F in a display manner of being dropped on a top layer. In this way, when the first user performs the drag operation on the enlarged sticker F, the sticker F may be dragged out of the sticker selection window.

In another embodiment, the drop prompt message for the sticker F may also be displayed in a process of moving the sticker F. As shown in FIG. 4C to FIG. 4F, the drop prompt message is substantially a drop prompt icon, and the drop prompt icon is adhered to the sticker F. For example, a drop cancel prompt icon 2) in the drop prompt message is displayed at an upper right corner of the sticker F, and a drop confirmation prompt icon in the drop prompt message is displayed at a lower right corner of the sticker F. The drop prompt message moves as the sticker F moves. In addition, the drop prompt message may also be displayed at an upper left corner and a lower left corner, or an upper left corner and the upper right corner, or a lower left corner and the lower right corner, of the sticker F. This is not specifically limited in this embodiment of this application.

It should be noted that because the sticker F is used for communicating and interacting with another person, the sticker F is usually dropped on the message presentation interface. Therefore, the drop prompt message may be displayed after the sticker F is moved to the message presentation interface. Certainly, the drop prompt message may also be displayed after the sticker F is moved.

Figure 4C:
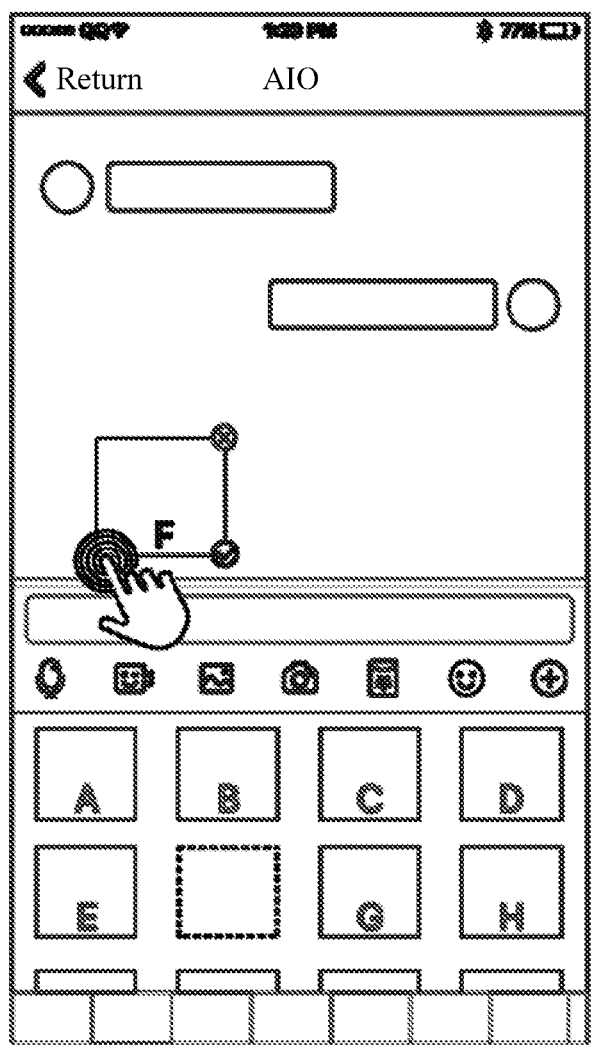
FIG. 4C is a schematic diagram of another message presentation interface according to an embodiment of this application.
Figure 4D:
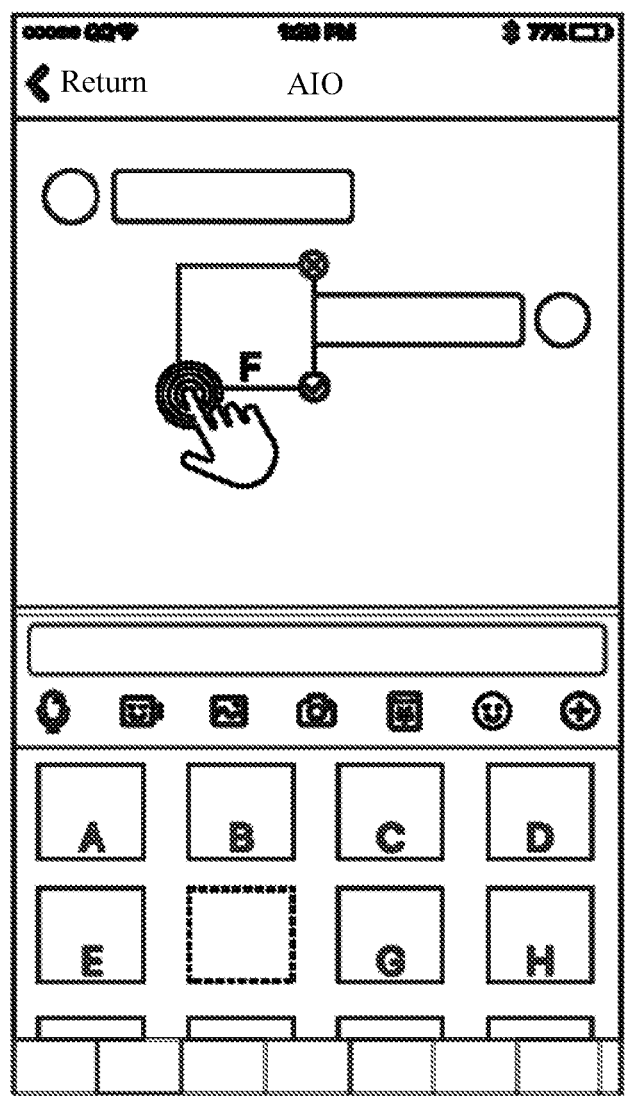
FIG. 4D is a schematic diagram of another message presentation interface according to an embodiment of this application.
Figure 4E:
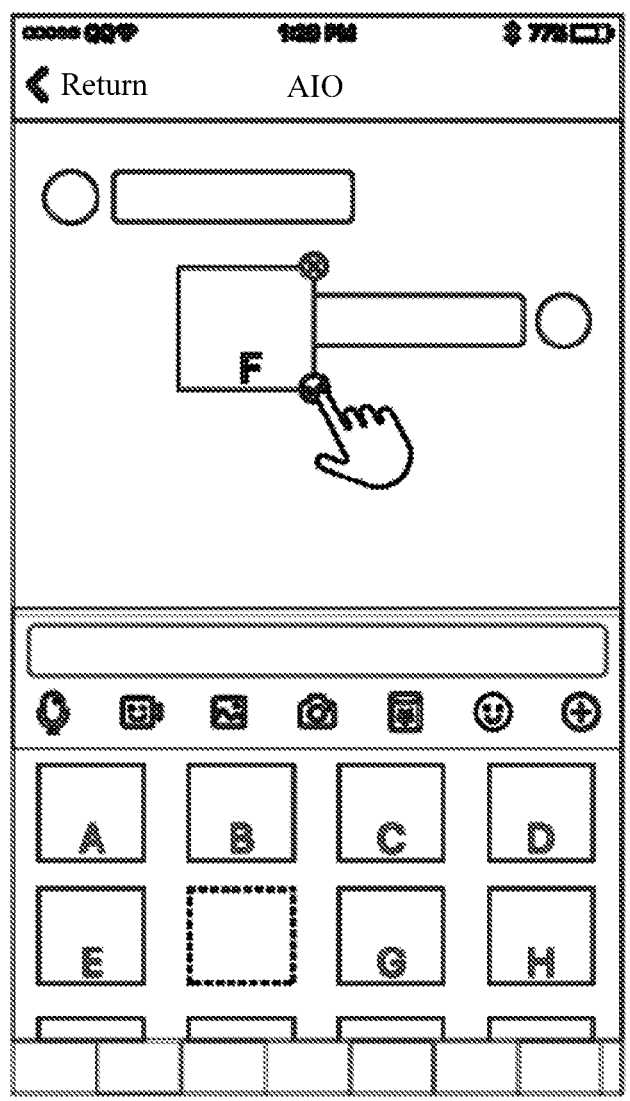
FIG. 4E is a schematic diagram of another message presentation interface according to an embodiment of this application.

In addition, as shown in FIG. 4C to FIG. 4E, in this embodiment of this application, to embody a drag effect for the sticker F, in a process of continuously performing the slide operation, the sticker F follows in real time and is presented at a location at which the first user and a terminal screen contact. That is, the sticker F is presented at a location to which a finger of the first user slides.

Figure 4F:
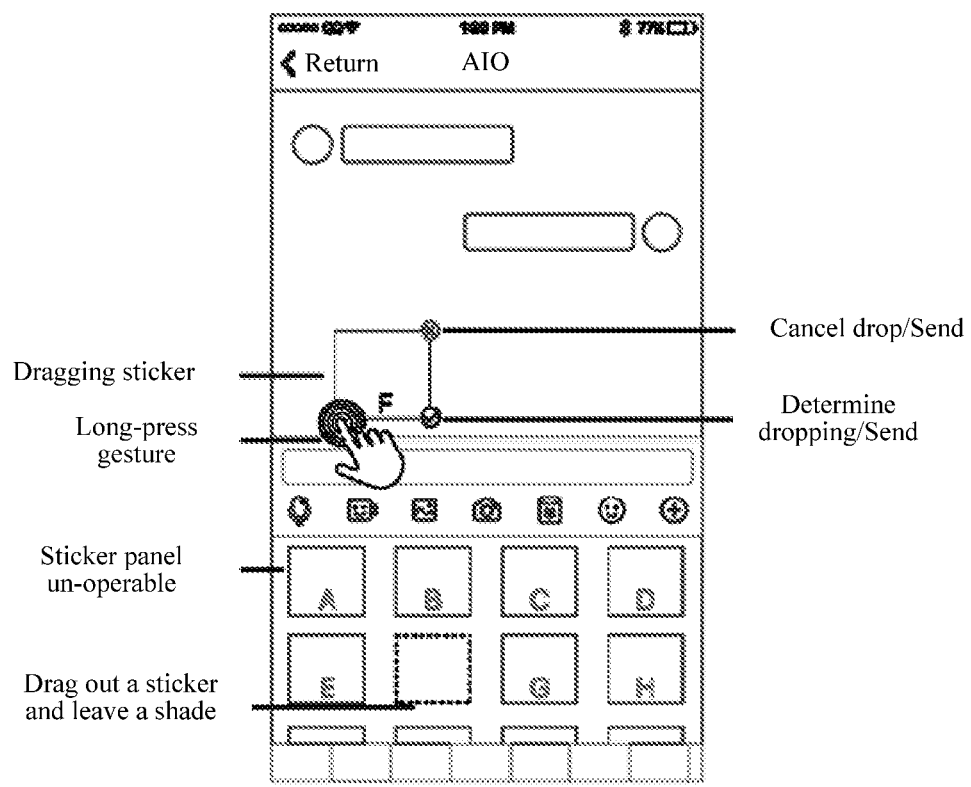
FIG. 4F is a schematic diagram of another message presentation interface according to an embodiment of this application.

In another embodiment, referring to FIG. 4F, after the sticker F starts to be dragged, other stickers in the sticker selection window are all in un-operable states, and an area at which the sticker F is located displays a shade left after dragging. Alternatively, the whole sticker selection window is in an un-operable state after the sticker F starts to be dragged.

In another embodiment, in a process of moving the sticker F, the slide operation may be randomly performed on the message presentation interface. Regardless of whether a blank area of the message presentation interface or a non-blank area on the message presentation interface in which text information or another sticker is presented is passed through in a moving process, the sticker F is always displayed on the message presentation interface in a display manner of being dropped on a top layer.

302: The first terminal obtains a drag stop instruction for the target sticker in a message presentation interface, and in response to the drag stop instruction, presents the target sticker at a first target location at which drag stops after receiving a drop confirmation instruction triggered by the drop prompt message.

In this embodiment of this application, when the first user stops dragging the target sticker, that is, after the first user performs the slide operation, if the first terminal detects that stop duration at a location exceeds specified duration, the first terminal obtains the drag stop instruction for the target sticker and responds to the drag stop instruction. In this case, the target sticker does not continue moving and being displayed but is displayed at a fixed location shown in any of FIG. 4C to FIG. 4E. Because, in this case, the first terminal does not determine whether the first user really intends to drop the target sticker at the fixed location, in this case, the drop prompt message is displayed on the target sticker in an adhering manner.

Figure 4G:
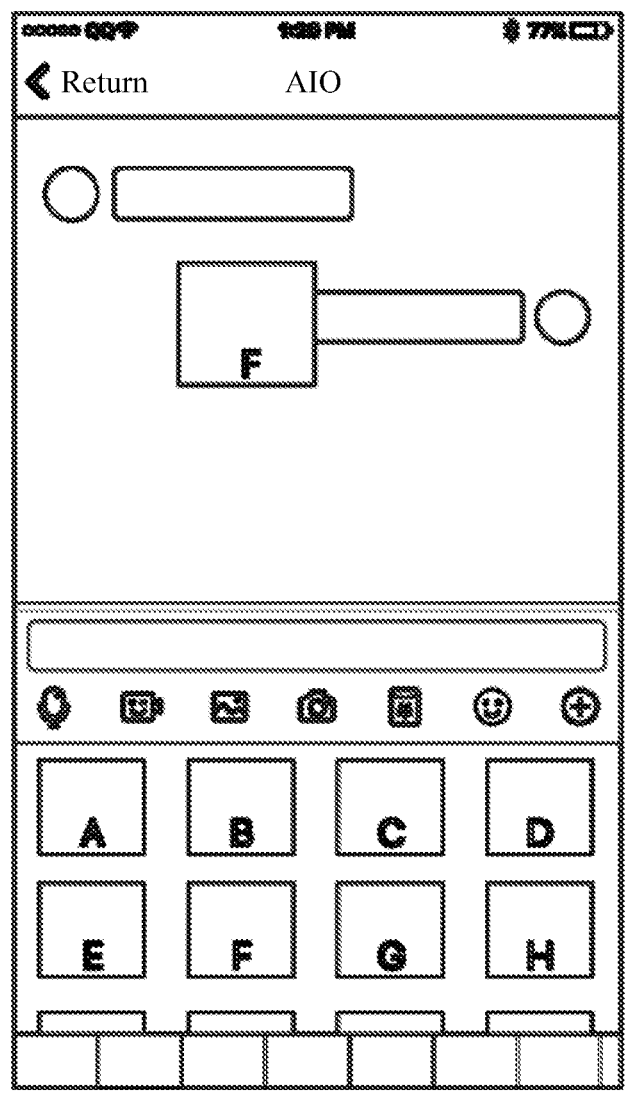
FIG. 4G is a schematic diagram of another message presentation interface according to an embodiment of this application.

As shown in FIG. 4E, if the first user clicks the drop confirmation prompt icon in this case, the first terminal receives the drop confirmation instruction and determines that the first user indeed intends to drop the target sticker at the fixed location, the fixed location at which the target sticker is currently located is determined as the first target location, and the target sticker is presented in a form of no adhered drop prompt message at the first target location. That is, a manner of presenting the target sticker after successful drop may be shown in FIG. 4G. In this case, the target sticker is successfully sent. Because drag, drop, and presentation of the target sticker are completed, currently, the sticker selection window restores to a previous operable state, and an area at which the target sticker is located also restores to an original display pattern. In this case, similar sticker drag and drop processing may be continued.

In another embodiment, if the first user clicks the drop cancel prompt icon ⊗ at the fixed location, the first terminal receives a drop cancel instruction and determines that the first user cancels dropping the target sticker at the fixed location. Therefore, presentation of the target sticker is canceled on the message presentation interface, that is, the target sticker disappears on the message presentation interface. In this situation, after the first user clicks the drop cancel prompt icon ⊗, currently, the sticker selection window also restores to the previous operable state, and the area at which the target sticker is located also restores to the original display pattern. In this case, similar sticker drag and drop processing may also be continued. This is not specifically limited in this embodiment of this application.

Figure 4H:
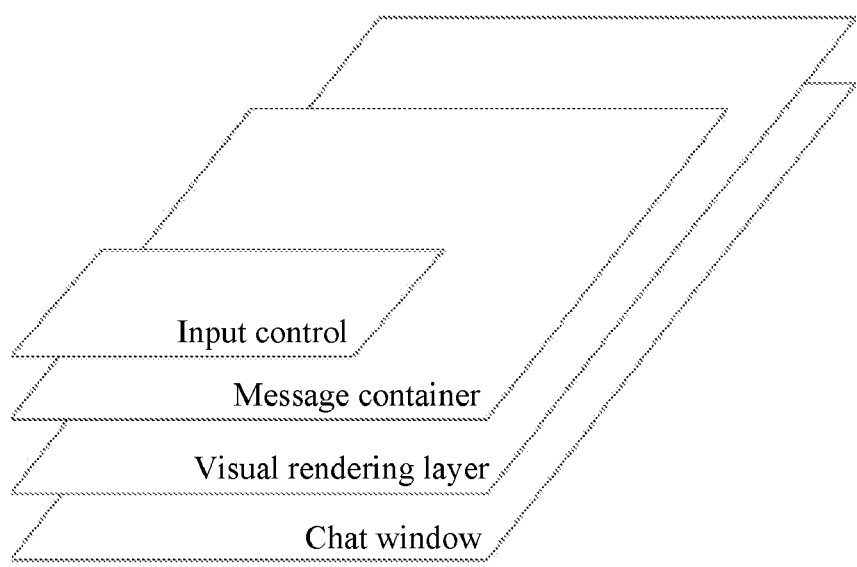
FIG. 4H is a schematic diagram of another message presentation interface according to an embodiment of this application.

It should be noted that this embodiment of this application can implement the foregoing sticker presentation method because a visual rendering layer of the message presentation interface is re-drawn. Referring to FIG. 4H, the group session interface includes the visual render layer, a message container disposed on the visual render layer, and an input control disposed on the message container.

The message container is a layer for accommodating a message generated in an interaction process of the first user and the second user. The message container may be rectangular, round, or of an irregular shape. This is not specifically limited in this embodiment of this application. In addition, an area for presenting the message in the message container may be non-transparent, and an area other than the area for presenting the message in the message container may be transparent or semi-transparent. The input control is a control for input and may include an input box. In this embodiment of this application, the visual rendering layer is re-drawn, that is, a user interface (UI) component is called to perform content drawing on the visual rendering layer by using a drawing method using a render object, so that the user can trigger, through an operation such as long press, dragging the sticker to the message presentation interface for random drop, hiding the sticker, re-calling the sticker, and the like.

In another embodiment, in this embodiment of this application, when a message generated by inputting conventionally by using an input box is presented, specifically, the message is presented in the message container, while the target sticker is presented through the visual rendering layer, so that presentation of a conventional message is separated from presentation of the special sticker, achieving a better presentation effect. After the visual rendering layer is included, the first terminal may present the target sticker in the following several manners.

A first manner is: drawing the target sticker presented at the first target location on the visual rendering layer in a presentation manner of being dropped on a top layer if a message box body is presented at the first target location, so that the target sticker is presented on the message box body in a superposing manner.

In this embodiment of this application, provided that the message box body and the target sticker have an overlapping part, it is determined that the message box body is presented at the first target location. That is, the first manner corresponds to a sticker presentation manner shown in FIG. 4G. The first target location may correspond to a geometric center of the target sticker. In other words, a location of a sticker or a message box body may be referred to with a geometric center thereof.

It should be noted that in this embodiment of this application, it may be set to only be supported that the randomly dropped sticker is superposed on the original message box body for presentation. That is, if the first user wants to drop the target sticker in an entirely blank area on the message presentation interface, drop does not succeed.

In this setting manner, after receiving the drop confirmation instruction, the first terminal may determine whether the message box body is presented at the first target location. If the message box body is presented at the first target location, the step of presenting the target sticker at the first target location is performed. If the message box body does not exist at the first target location, a re-drop prompt message is displayed. The re-drop prompt message may be displayed in a fringe area of the message presentation interface in a strip display manner, to avoid excessive coverage of the message presentation interface as much as possible.

The message box body presents a message generated by inputting in a conventional input box manner. The generated message may be pure text information, or may be only a sticker, or may be a combination of text information and a sticker. This is not specifically limited in this embodiment of this application.

A second manner is: drawing the target sticker presented at the first target location on the visual rendering layer in a presentation manner of being dropped on a top layer if a message box body is presented at the first target location, and another sticker is presented on the message box body in a superposing manner, so that the target sticker is presented on the another sticker in a superposing manner.

It should be noted that the another sticker herein is a sticker that is previously randomly dropped on the message box body through a drag operation.

Figure 4I:
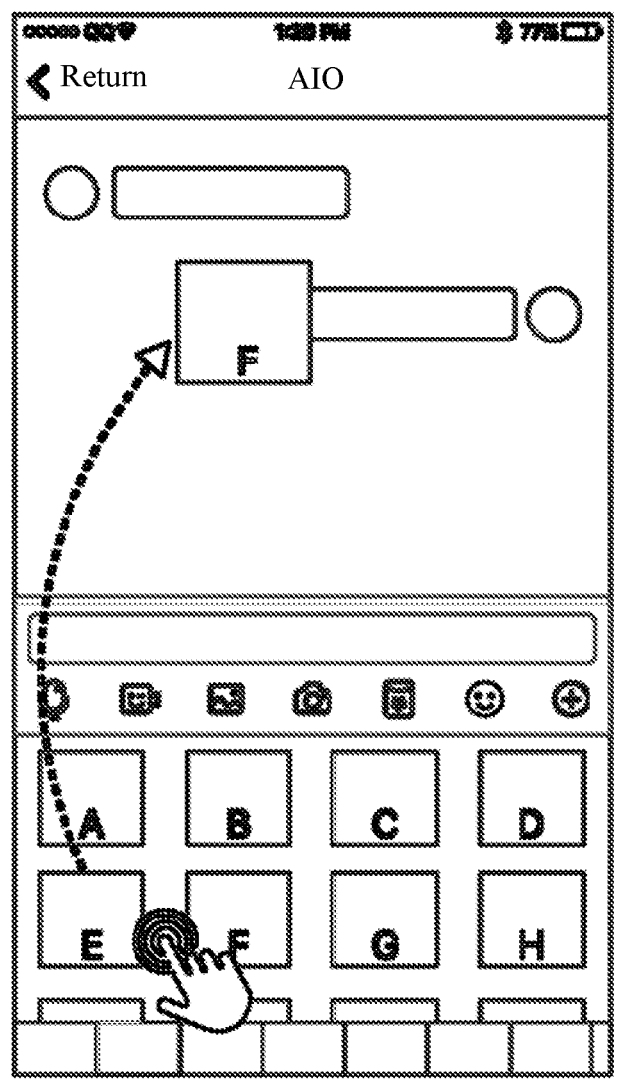
FIG. 4I is a schematic diagram of another message presentation interface according to an embodiment of this application.
Figure 4J:
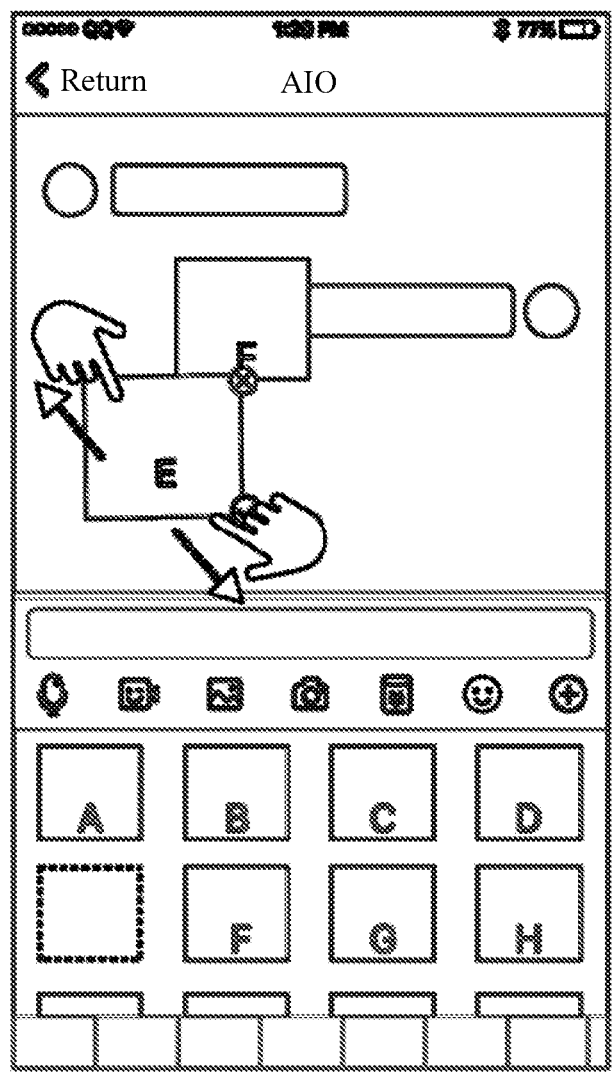
FIG. 4J is a schematic diagram of another message presentation interface according to an embodiment of this application.

The second manner mainly is a manner of stacking a sticker on a sticker. As shown in FIGS. 4I and 4J, the sticker E is superposed on the sticker F. Provided that the message box body, the target sticker, and the another sticker have an overlapping part, it can be determined that the message box body, the target sticker, and the another sticker are simultaneously presented at the first target location.

A third manner is: drawing the target sticker presented at the first target location on the visual rendering layer if the first target location is blank.

In the third manner, in this embodiment of this application, it may also be set to be supported that the randomly dropped sticker is presented in a blank. That is, if the first user wants to drop the target sticker in an entirely blank area on the message presentation interface, drop also succeeds without depending on the message box body.

In conclusion, in this embodiment of this application, drag and random drop for the target sticker on the first terminal are completed. To make the target sticker on the message presentation interface of the second terminal also have the same presentation effect rather than presenting the target sticker according to a sequence in a conventional manner, this embodiment of this application further includes the following step 303 to step 307.

303: The first terminal sends sticker presentation data to a server, the sticker presentation data including at least first coordinate location information, first screen size information, and identification information of at least one presentation element.

In this embodiment of this application, the sticker presentation data is generated by the first terminal in the following manner: obtaining, by the first terminal, first screen size information of the first terminal; determining at least one presentation element associated with the target sticker; calculating first coordinate location information of the target sticker relative to the at least one presentation element; and then generating the sticker presentation data at least according to the first coordinate location information, the first screen size information, and the identification information of the at least one presentation element.

The at least one presentation element is a message box body and/or a sticker presented at the first target location. That is, when only the message box body is presented at the first target location, the at least one presentation element is only the message box body, for example, referring to a situation shown in FIG. 4E. When another sticker is displayed on the message box body presented at the first target location in a superposing manner, the at least one presentation element includes the message box body and the another sticker, for example, referring to a situation shown in FIG. 4J. Certainly, if the sticker is supported to be dropped in a blank, the at least one presentation element also includes only the another sticker.

In addition, in this embodiment of this application, the first screen size information needs to be obtained because currently, the terminal has various sizes. To synchronize terminals of different sizes and make the terminals of different sizes have a consistent display effect when displaying the target sticker, relative positions of the target sticker and the at least one presentation element also need to be converted based on a difference between size information of the terminals. For example, an overlapping part between the target sticker and the message box body on the message presentation interface of the first terminal is 30%. Therefore, it also needs to be ensured that an overlapping part between the target sticker and the message box body on the message presentation interface of the second terminal is 30%.

It should be noted that if the target sticker is presented at a blank location on the message presentation interface, the first coordinate location information is absolute location information. That is, in addition to that coordinate locations are converted on the message presentation interface of the second terminal according to relative first coordinate location information and first screen size information, corresponding conversion may be performed according to absolute first coordinate location information and first screen size information. This is not specifically limited in this embodiment of this application. The identification information of the at least one presentation element is used for helping the second terminal fast lock a rough location of the target sticker in all content presented on the message presentation interface.

When sending the sticker presentation data to the server, the first terminal may reuse an original message channel for transmitting message data. This is not specifically limited in this embodiment of this application.

304: The server sends the sticker presentation data to a second terminal after receiving the sticker presentation data.

The server may also reuse the original message channel for transmitting message data and sends the sticker presentation data to the second terminal.

305: The second terminal determines a presentation range area of a target sticker on a message presentation interface according to the identification information of the at least one presentation element after receiving the sticker presentation data sent by the first terminal.

A presentation area of the at least one presentation element and a peripheral area of the at least one presentation element may both be determined as presentation range areas of the target sticker.

306: The second terminal obtains second screen size information of the second terminal and a second target location within the presentation range area according to the first screen size information, the second screen size information, and the first coordinate location information.

In this embodiment of this application, the second terminal may first calculate second coordinate location information of the target sticker relative to the at least one presentation element on the message presentation interface of the second terminal according to the first screen size information, the second screen size information, and the first coordinate location information, and then calculates the second target location according to second coordinate location information and location information of the at least one presentation element.

307: The second terminal superposes the target sticker on the at least one presentation element for presentation in a display manner of being dropped on a top layer at the second target location.

When presenting the target sticker, the second terminal also draws the target sticker on the visual rendering layer in a manner similar to the foregoing manner of presenting the target sticker on the message presentation interface of the first terminal, so that the manner of presenting the target sticker on the message presentation interface of the second terminal is consistent with the manner for presenting the first terminal.

In this embodiment of this application, as shown in FIG. 4A to FIG. 4G, after drag and drop of the sticker F are completed, a sticker E may continue to be dragged and dropped shown in FIG. 4I. That is, in this embodiment of this application, the sticker is supported to be dragged and dropped for a plurality of times. In addition, this embodiment of this application also supports that after the sticker is dropped on the message presentation interface, processing operations such as zooming in, zooming out, and rotation may be performed on the dropped sticker. For a detailed process, refer to the following descriptions.

First, the dropped sticker is scaled. That is, after obtaining a scaling instruction for the dropped sticker, the first terminal obtains a target scaling ratio matching the scaling instruction and further performs scaling processing on the sticker according to the target scaling ratio.

The scaling processing may be zooming-in processing or may be zooming-out processing. There may be a plurality of manners of obtaining the scaling instruction. As shown in FIG. 4J, when scaling processing is performed on the dropped sticker E, it can be implemented through operation with two hands. For example, when zooming-in processing is performed, two index fingers may be respectively placed in an upper left corner and an upper left corner shown in the figure and slide according to a direction gradually getting away shown in the figure. A larger sliding distances indicates a larger zooming-in proportion of the sticker E. The first terminal may preset a correspondence between the sliding distance and the zooming-in proportion, to calculate, according to the obtained sliding distance, to which size the sticker E needs to be zoomed in.

Certainly, in addition to the zooming-in manner shown in FIG. 4J, provided that the first terminal detects that there two contact locations on the sticker E, regardless of whether the two contact locations are implemented through two hands or a hand, and locations of two contacts gradually get away from each other, it is determined that the first user performs zooming-in processing on the sticker E.

Correspondingly, still using FIG. 4J as an example, for zooming-out processing, two index fingers may also be respectively placed in an upper left corner and an upper left corner shown in the figure and slide according to a direction gradually getting close. A larger sliding distances indicates a larger zooming-out proportion of the sticker E. That is, a closer distance indicates a larger zooming-out proportion. Certainly, in addition to this zooming-out manner, provided that the first terminal detects that there are two contact locations on the sticker E, and the two contact locations gradually get close, it can be determined that the first user performs zooming-out processing on the sticker E.

In another embodiment, after determining that the first user performs scaling processing on the sticker E, the first terminal may display the foregoing drop prompt information again, to perform drop prompt on the first user. After the first user completes scaling processing of the sticker E, if the first terminal detects a drop confirmation operation of the first user, the scaled sticker E is presented. If the first terminal detects a cancel confirmation operation of the first user, the initial sticker E before scaling is presented.

In another embodiment, after the first user performs scaling processing on the sticker E, to make the sticker E on the message presentation interface of the second terminal have the same presentation effect, the sticker E is synchronously presented in a zooming-in or zooming-out manner. In this embodiment of this application, scaling data of the sticker E may be sent to the second terminal through the server, so that the second terminal synchronously presents the sticker E on the message presentation interface according to the scaling data. The scaling data includes at least the sticker E and a target scaling ratio of the sticker E.

Second, the dropped sticker is rotated. That is, after obtaining a rotation instruction for the dropped sticker, the first terminal obtains a target rotation direction and a target rotation angle that match the rotation instruction, and performs rotation processing on the target sticker according to the target rotation direction and the target rotation angle.

Figure 4K:
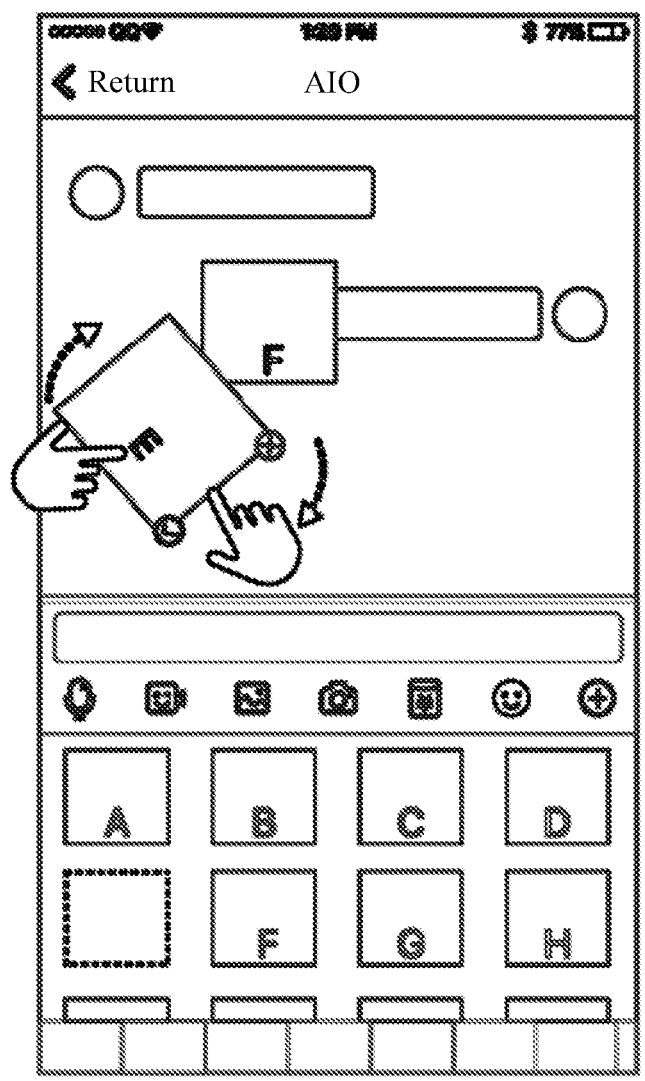
FIG. 4K is a schematic diagram of another message presentation interface according to an embodiment of this application.
Figure 4L:
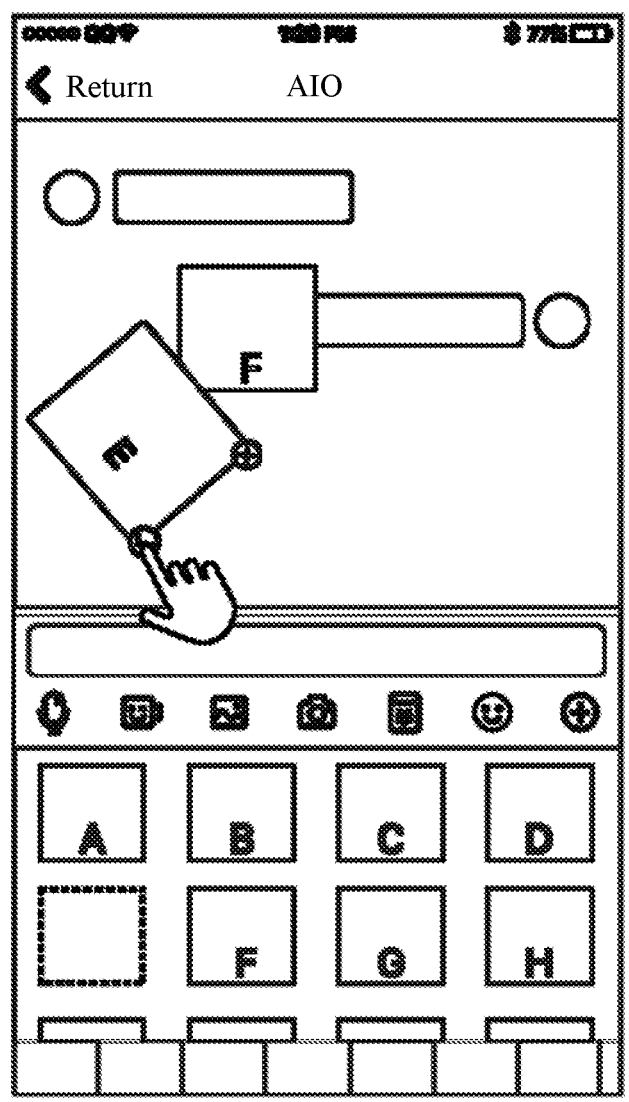
FIG. 4L is a schematic diagram of another message presentation interface according to an embodiment of this application.
Figure 4M:
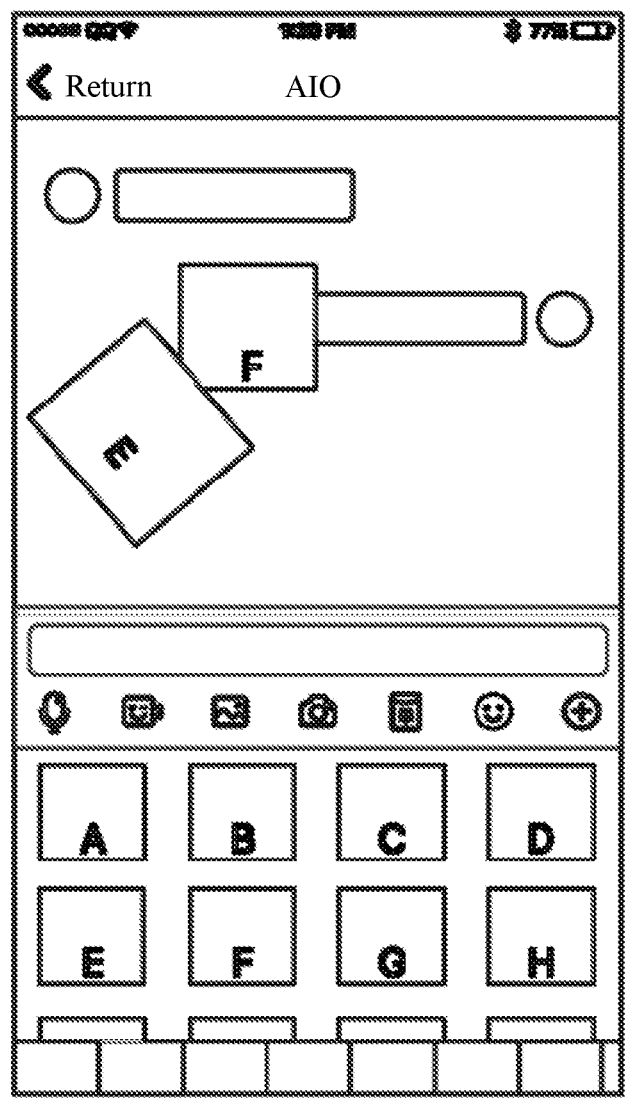
FIG. 4M is a schematic diagram of another message presentation interface according to an embodiment of this application.

FIG. 4K to FIG. 4M are schematic diagrams of rotating the sticker E. There is also a plurality of manners of obtaining the rotation instruction. FIG. 4K is a common one. That is, when the first terminal detects that there is one contact location on the sticker E, and the touch location slides clockwise or anticlockwise, it is determined that the first user performs rotation processing on the sticker E. A larger amplitude of the slide operation indicates a larger rotation angle of the sticker E. Similarly, the first terminal may preset a correspondence between a sliding amplitude and the rotation angle, to calculate, according to the obtained sliding amplitude, to which angle the sticker E needs to be rotated.

In another embodiment, after determining that the first user performs rotation processing on the sticker E, the first terminal may display the foregoing drop prompt information again, to perform drop prompt on the first user, as shown in FIG. 4K to FIG. 4M. After the first user completes rotation processing of the sticker E, as shown in FIG. 4L, if the first terminal detects a drop confirmation operation of the first user, the rotated sticker E is presented. If the first terminal detects a cancel confirmation operation of the first user, the initial sticker E before rotated is presented.

In another embodiment, after the first user performs rotation processing on the sticker E, to make the sticker E on the message presentation interface of the second terminal have the same presentation effect, the rotated sticker E is synchronously presented. In this embodiment of this application, rotation data of the sticker E may be sent to the second terminal through the server, so that the second terminal synchronously presents the sticker E on the message presentation interface according to the rotation data. The rotation data includes at least the sticker E, and a target rotation direction and a target rotation angle of the sticker E. After the second terminal performs rotation processing on the sticker E, a presentation effect is also shown in FIG. 4M.

It should be noted that in this embodiment of this application, in addition to performing scaling processing and rotation processing on the dropped sticker, this embodiment of this application also supports hiding and re-calling the dropped sticker through a gesture operation. For example, there are currently excessively many dropped stickers on the message presentation interface, and viewing of the first user for messages is affected. Therefore, the dropped sticker may be hidden. Further, after the dropped sticker is hidden, a re-calling operation may be performed on the hidden sticker, so that the previously hidden sticker is presented on the message presentation interface again.

First, a hiding operation is performed on the dropped sticker.

That is, as shown in FIG. 4N to FIG. 4R, after obtaining a hiding presentation instruction for the dropped sticker, the first terminal controls the dropped sticker to start to move from the first target location to a preset termination location according to a preset moving track, and adjust transparency and a size of the dropped sticker in a moving process until presentation for the target sticker is canceled.

Figure 4N:
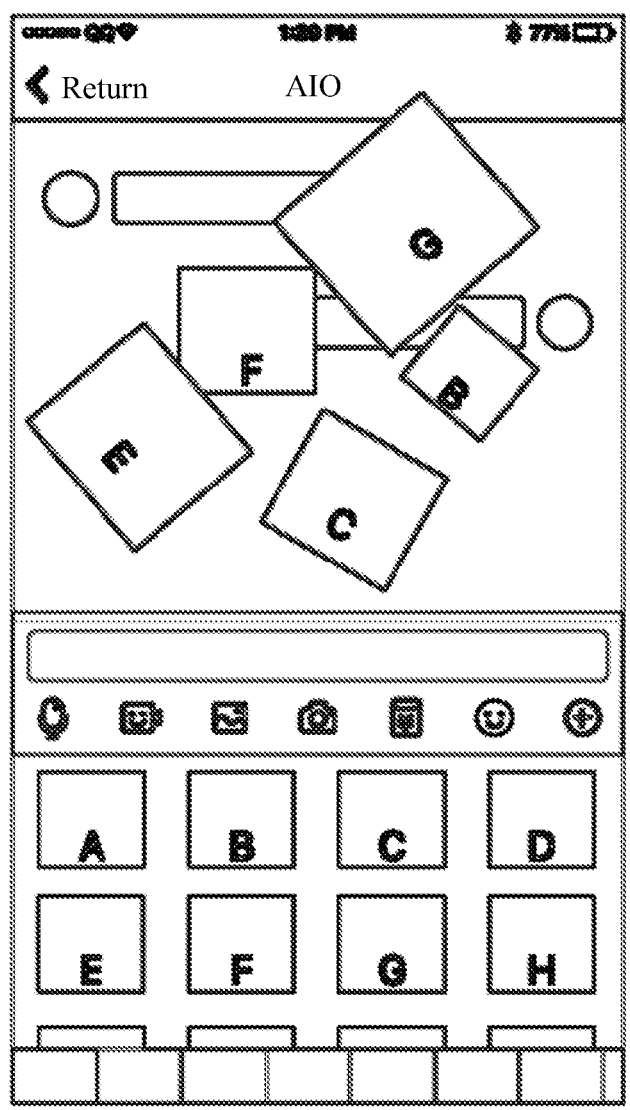
FIG. 4N is a schematic diagram of another message presentation interface according to an embodiment of this application.

As shown in FIG. 4N, the message presentation interface currently includes a plurality of dropped stickers, and viewing of the first user for messages is greatly affected. In this case, the first user may perform a hiding operation on the dropped stickers. In this embodiment of this application, a hiding operation is supported to hide all the dropped stickers currently on the message presentation interface for once.

Figure 4O:
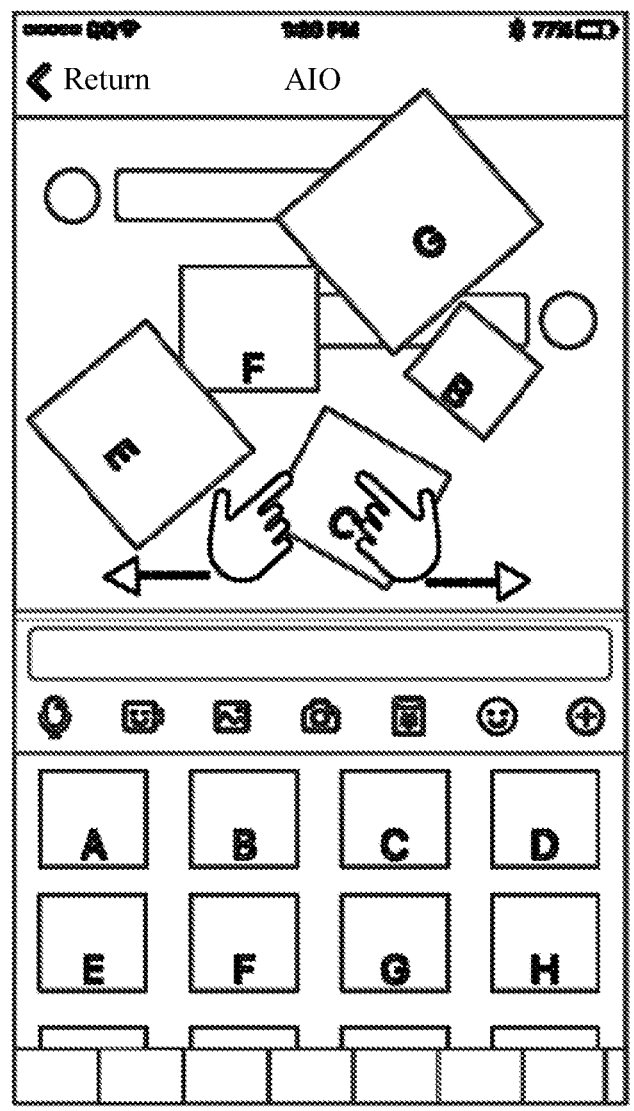
FIG. 4O is a schematic diagram of another message presentation interface according to an embodiment of this application.
Figure 4P:
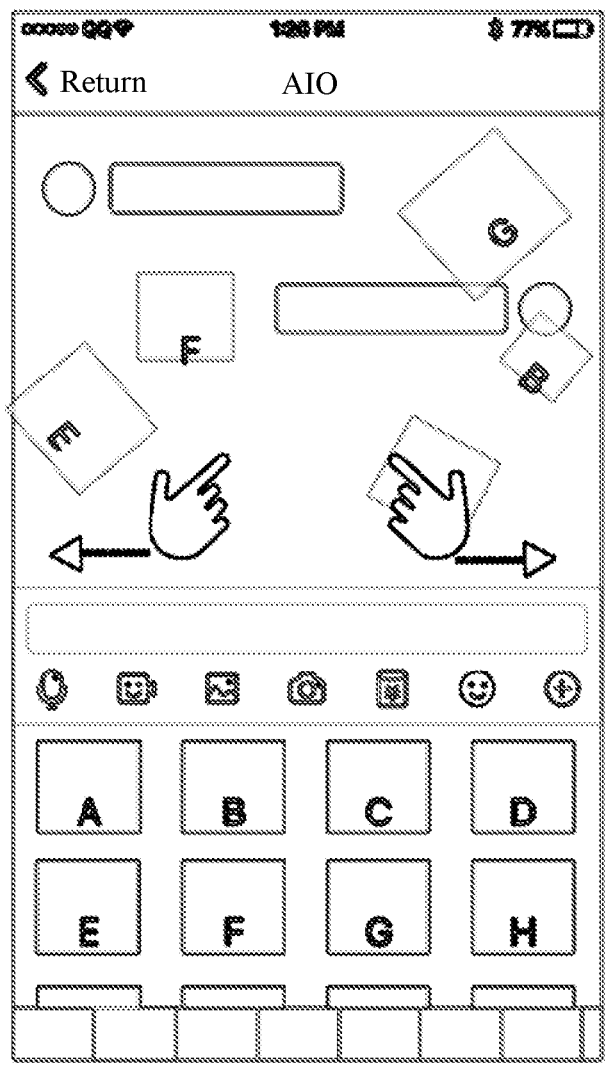
FIG. 4P is a schematic diagram of another message presentation interface according to an embodiment of this application.
Figure 4Q:
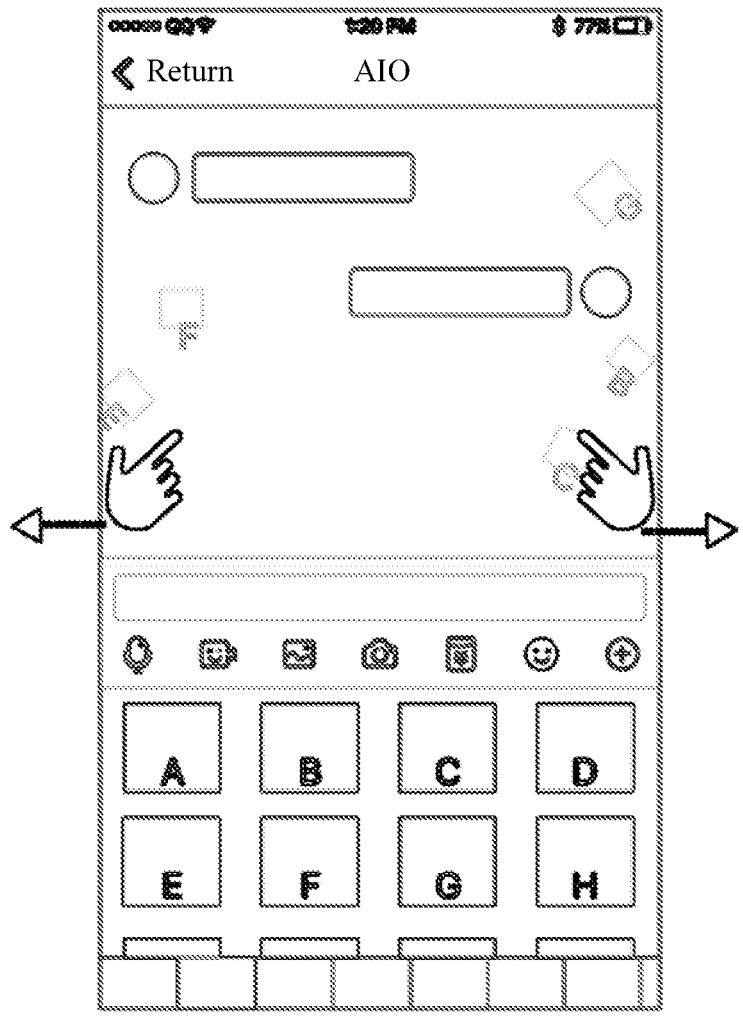
FIG. 4Q is a schematic diagram of another message presentation interface according to an embodiment of this application.

As shown in FIG. 4O to FIG. 4Q, a manner of obtaining the hiding presentation instruction in this embodiment of this application may be: using a center of a screen as a dividing point and gradually sliding two fingers from the middle of the screen to two sides. That is, when the first terminal detects that two contact locations gradually get away from a left side and a right side of the screen, it is determined that the first user performs the hiding operation on the dropped sticker.

In other words, the preset termination location is the left side and the right side of the screen. For each dropped sticker, a preset termination location of the dropped sticker may be randomly set as the left side of the screen or the right side of the screen or set according to a distance away from two sides of the screen. For example, a preset termination location of a sticker closer to the left side of the screen is the left side of the screen, and a preset termination location of a sticker closer to the right side of the screen is the right side of the screen.

As shown in FIG. 4O to FIG. 4Q, in a process in which fingers of the first user gradually get away, the dropped stickers move along with the fingers. The dropped sticker usually moves according to a preset moving track in a moving process. For example, the preset moving track may be a straight track, a wave-shaped track, a curved track, and the like. This is not specifically limited in this embodiment of this application.

Figure 4R:
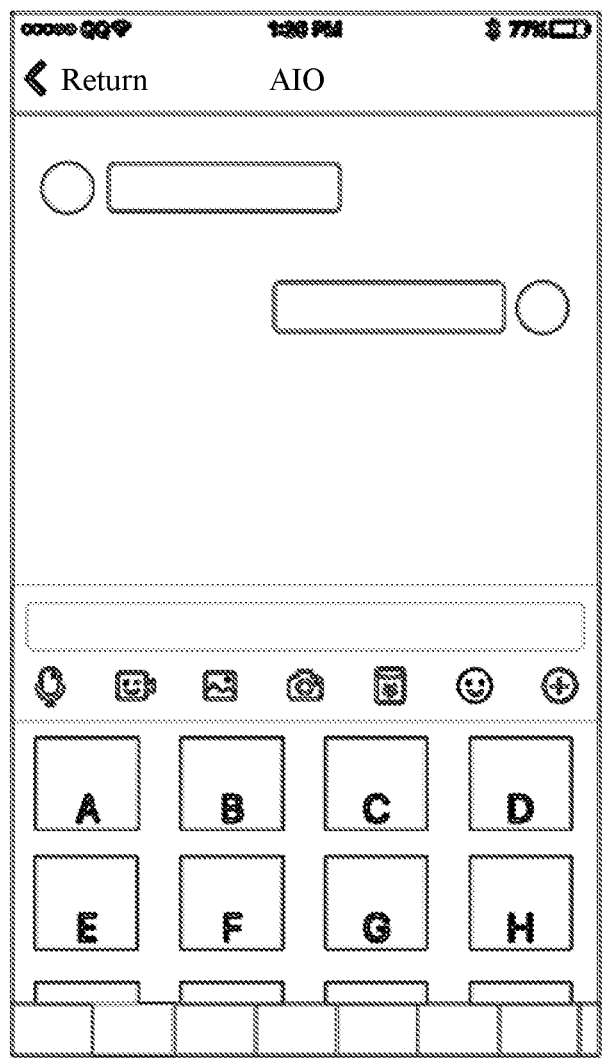
FIG. 4R is a schematic diagram of another message presentation interface according to an embodiment of this application.

In another embodiment, to enhance a user experience effect, transparency and a size of each sticker may also be adjusted in a process of moving the dropped sticker. For example, as shown in FIG. 4O to FIG. 4Q, a dropped sticker closer to the preset termination location is smaller and has higher transparency. When a user finger slides to the edge of the screen, the dropped sticker completely disappears, and transparency is full transparency. A faster speed of sliding of the user finger indicates a faster speed of disappearance of the dropped sticker. That is, the faster transparency of each sticker increases, the faster a size decreases. After the dropped sticker is hidden, the message presentation interface is shown in FIG. 4R.

It should be noted that the preset termination location may also be an upper side and a lower side of the screen or an upper left corner and a lower right corner of the screen, or a lower left corner and an upper right corner of the screen, in addition to the left side and the right side of the screen. This is not specifically limited in this embodiment of this application.

Figure 4S:
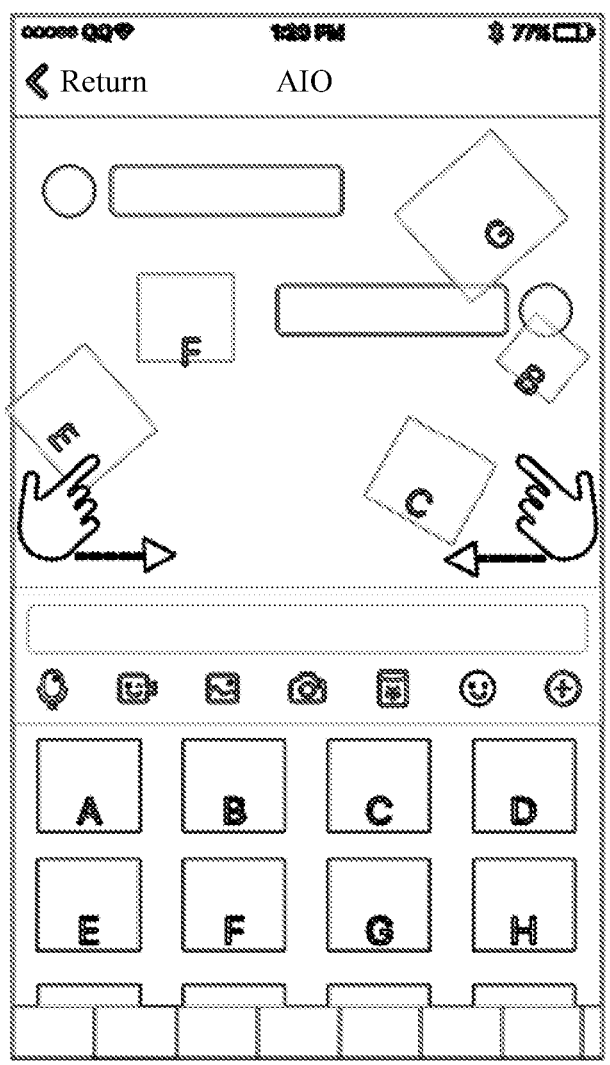
FIG. 4S is a schematic diagram of another message presentation interface according to an embodiment of this application.
Figure 4T:
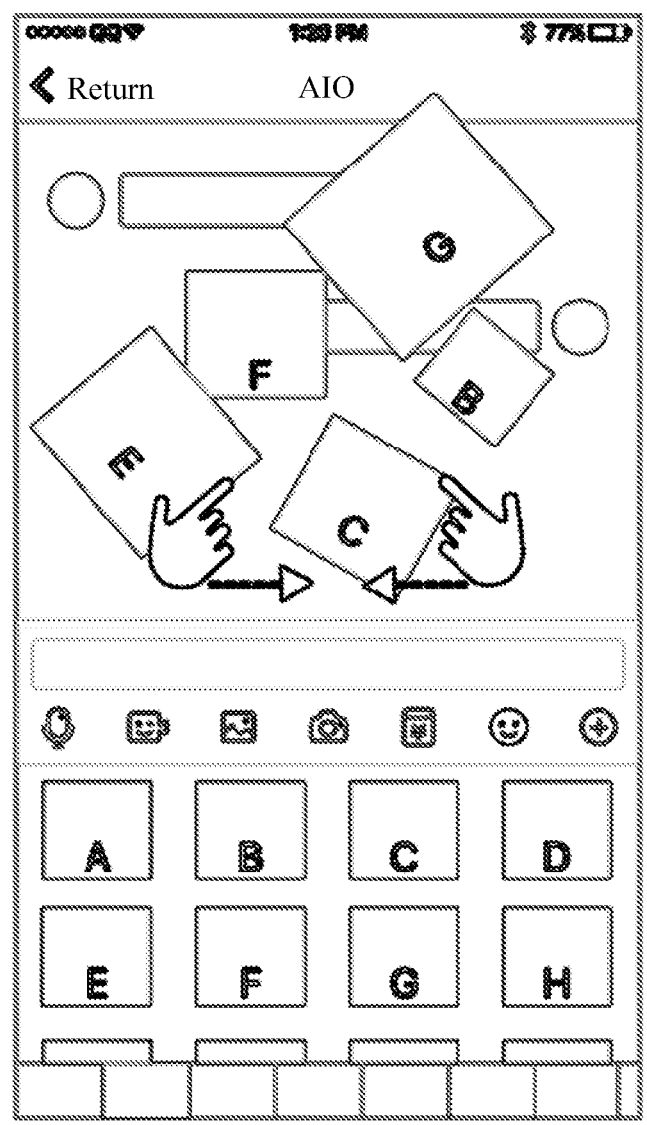
FIG. 4T is a schematic diagram of another message presentation interface according to an embodiment of this application.

Second, the previously hidden sticker is re-called. As shown in FIG. 4S and FIG. 4T, after obtaining a hiding cancel instruction for the dropped sticker, the first terminal controls the dropped sticker to start to move from the preset termination location to the first target location according to the preset moving track and adjust the transparency and the size of the target sticker in a moving process until the target sticker restores to an original size and original transparency. When closer to an original location, each dropped sticker is larger and has lower transparency.

The re-calling operation and the hiding operation are used as mutually inverse processes. That is, as shown in FIG. 4S and FIG. 4T, two fingers may gradually slide from two sides of the screen to the center of the screen. In this case, the previously hidden sticker appears from the left side and the right side of the screen and gradually moves to the center of the screen according to a preset track, and in a moving process, transparency is lowered, and the size is increased. When each sticker arrives at the original location, the sticker has no transparency and an original size, that is, restores to a state shown in FIG. 4N.

In the method according to this embodiment of this application, when a sticker is presented, a selected sticker drag operation is supported in a sticker selection window, and in a process of dragging and moving the sticker, the sticker is supported to be randomly dropped on a message presentation interface. Therefore, such a sticker presentation manner is more vivid, interaction manners are more diversified, and a display effect is good.

In addition, in this embodiment of this application, operations such as zooming in, zooming out, rotation, hiding, and re-calling on the dropped sticker are supported. Therefore, presentation patterns on the sticker are further enriched, thereby diversifying interaction.

Figure 5:
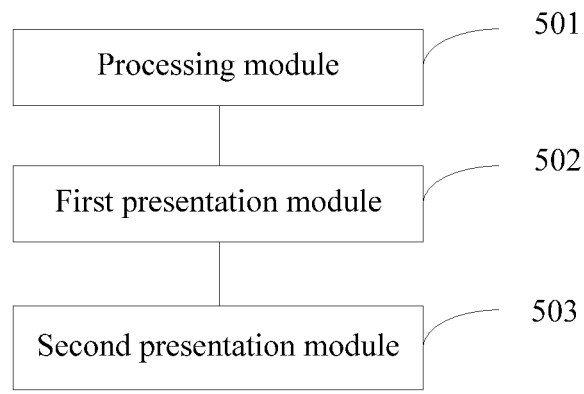
FIG. 5 is a schematic structural diagram of a sticker presentation apparatus according to an embodiment of this application.

FIG. 5 is a schematic structural diagram of a sticker presentation apparatus according to an embodiment of this application. Referring to FIG. 5, the apparatus includes one or more processors and one or more memories storing a program unit, the program unit being executed by the processor, and the program unit including:

a processing module 501, configured to obtain, after obtaining a drag instruction for a selected target sticker in a sticker selection window, the target sticker according to an obtained drag track;

a first presentation module 502, configured to display a drop prompt message in a process of moving the target sticker; and a second presentation module 503, configured to obtain a drag stop instruction for the target sticker in a message presentation interface, and in response to the drag stop instruction, present the target sticker at a first target location at which drag stops after receiving a drop confirmation instruction triggered by the drop prompt message.

In another embodiment, the program unit further includes:
an obtaining module, configured to obtain, after obtaining a scaling instruction for the target sticker, a target scaling ratio matching the scaling instruction,
the processing module being further configured to perform scaling processing on the target sticker according to the target scaling ratio, to obtain a scaled target sticker; and
the presentation module being configured to present the scaled target sticker at the first target location.

In another embodiment, the program unit further includes:
an obtaining module, configured to obtain, after obtaining a rotation instruction for the target sticker, a target rotation direction and a target rotation angle that match the rotation instruction,
the processing module being further configured to perform rotation processing on the target sticker according to the target rotation direction and the target rotation angle, to obtain a rotated target sticker; and
the presentation module being configured to present the rotated target sticker at the first target location.

In another embodiment, the message presentation interface includes a visual rendering layer; and
the second presentation module 503 is configured to: draw the target sticker presented at the first target location on the visual rendering layer in a presentation manner of being dropped on a top layer if a message box body is presented at the first target location, so that the target sticker is presented on the message box body in a superposing manner; or draw the target sticker presented at the first target location on the visual rendering layer in a presentation manner of being dropped on a top layer if a message box body is presented at the first target location, and another sticker is presented on the message box body in a superposing manner, so that the target sticker is presented on the another sticker in a superposing manner; or draw the target sticker presented at the first target location on the visual rendering layer if the first target location is blank.

In another embodiment, the second presentation module 503 is further configured to control, after obtaining a hiding presentation instruction for the target sticker, the target sticker to move from the first target location to a preset termination location according to a preset moving track; and adjust transparency and a size of the target sticker in a moving process until presentation for the target sticker is canceled,
the target sticker closer to the preset termination location being smaller and having higher transparency.

In another embodiment, the second presentation module 503 is further configured to control, after obtaining a hiding presentation instruction for the target sticker, the target sticker to move from the first target location to a preset termination location according to a preset moving track; and adjust transparency and a size of the target sticker in a moving process until presentation for the target sticker is canceled, the target sticker closer to the preset termination location being smaller and having higher transparency.

In another embodiment, the program unit further includes:

an obtaining module, configured to obtain first screen size information of the first terminal;

a determining module, configured to determine at least one presentation element associated with the target sticker, the presentation element being a message box body and/or a sticker presented at the first target location;

a calculation module, configured to calculate first coordinate location information of the target sticker relative to the at least one presentation element; and a sending module, configured to send sticker presentation data to a second terminal, so that the second terminal presents the target sticker according to the sticker presentation data, the sticker presentation data including at least the first coordinate location information, the first screen size information, and identification information of the at least one presentation element, a second user of the second terminal being located in a friend relation chain of a first user of the first terminal.

In the apparatus according to this embodiment of this application when a sticker is presented, a selected sticker drag operation is supported in a sticker selection window, and in a process of dragging and moving the sticker, the sticker is supported to be randomly dropped on a message presentation interface. Therefore, such a sticker presentation manner is more vivid, interaction manners are more diversified, and a display effect is good.

In addition, in this embodiment of this application, operations such as zooming in, zooming out, rotation, hiding, and re-calling on the dropped sticker are supported. Therefore, presentation patterns on the sticker are further enriched, thereby diversifying interaction.

Figure 6:
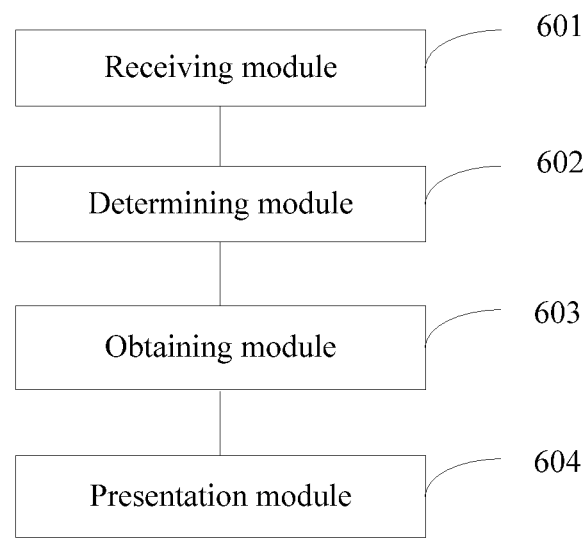
FIG. 6 is a schematic structural diagram of another sticker presentation apparatus according to an embodiment of this application.

FIG. 6 is a schematic structural diagram of a sticker presentation apparatus according to an embodiment of this application. Referring to FIG. 6, the apparatus includes one or more processors and one or more memories storing a program unit, the program unit being executed by the processor, and the program unit including:

a receiving module 601, configured to receive sticker presentation data sent by a first terminal, the sticker presentation data including at least first coordinate location information, first screen size information, and identification information of at least one presentation element;

a determining module 602, configured to determine a presentation range area of a target sticker on a message presentation interface according to the identification information of the at least one presentation element;

an obtaining module 603, configured to obtain second screen size information of the second terminal, the determining module being further configured to determine a second target location within the presentation range area according to the first screen size information, the second screen size information, and the first coordinate location information; and a presentation module 604, configured to superpose the target sticker on the at least one presentation element for presentation in a display manner of being dropped on a top layer at the second target location.

In the apparatus according to this embodiment of this application when a sticker is presented, a selected sticker drag operation is supported in a sticker selection window, and in a process of dragging and moving the sticker, the sticker is supported to be randomly dropped on a message presentation interface. Therefore, such a sticker presentation manner is more vivid, interaction manners are more diversified, and a display effect is good.

In addition, in this embodiment of this application, operations such as zooming in, zooming out, rotation, hiding, and re-calling on the dropped sticker are supported. Therefore, presentation patterns on the sticker are further enriched, thereby diversifying interaction.

It should be noted that when the sticker presentation apparatus according to the foregoing embodiment performs sticker presentation, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the sticker presentation apparatus and the sticker presentation method provided in the foregoing embodiments belong to one conception. For the specific implementation process, refer to the method embodiments, and details are not described herein again.

Figure 7:
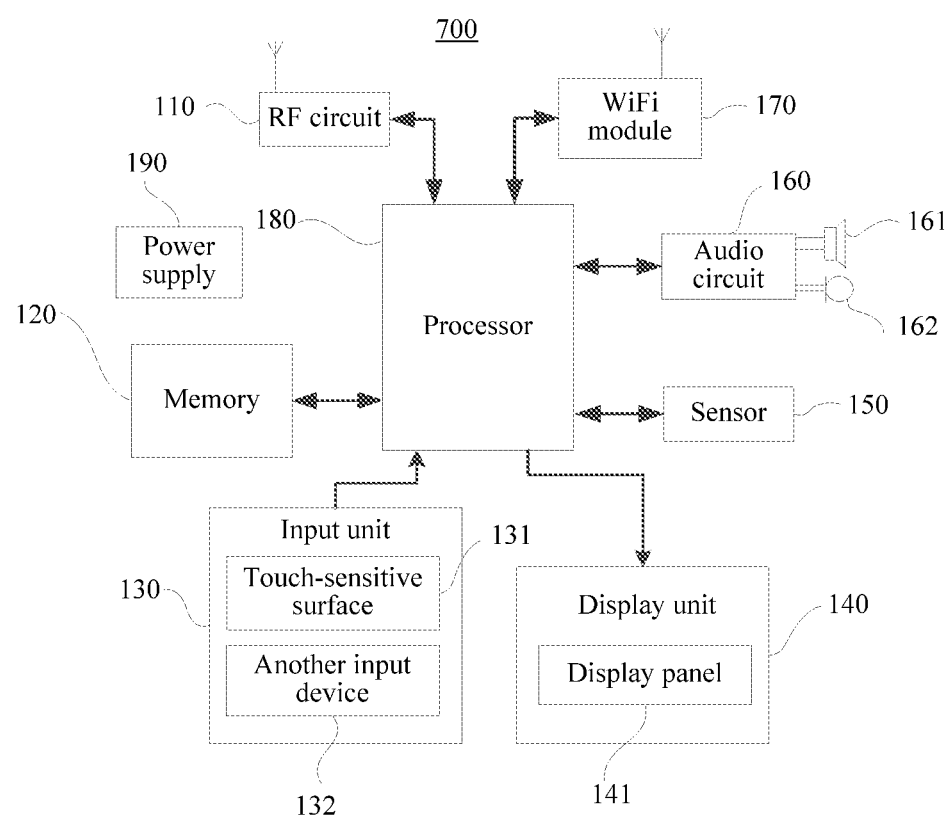
FIG. 7 is a schematic structural diagram of a terminal according to an embodiment of this application.

FIG. 7 is a schematic structural diagram of an electronic terminal according to an embodiment of this application. The electronic terminal may be configured to perform the sticker presentation method provided in the foregoing embodiment. Referring to FIG. 7, the terminal 700 includes:

components such as a radio frequency (RF) circuit 110, a memory 120 including one or more computer-readable storage mediums, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 7 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 700, and the like. In addition, the memory 120 may include a high-speed random access memory, and may further include a non-volatile memory such as at least one magnetic disk storage device or a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive a command sent by the processor 180 and execute the command. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 700. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 7, the touch-sensitive surface 131 and the display panel 141 are used as two separate components to implement input and output functions, in some embodiments, the touch-sensitive surface 131 and the display panel 141 may be integrated to implement the input and output functions.

The terminal 700 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 700, are not further described herein.

The audio circuit 160, a speaker 161, and a microphone 162 may provide audio interfaces between the user and the terminal 700. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 700.

WiFi is a short distance wireless transmission technology. The terminal 700 may help, by using the WiFi module 170, the user to receive and send emails, browse a web page, access streaming media, and so on, which provides wireless broadband Internet access for the user.

The processor 180 is a control center of the terminal 700, which is connected to various parts of the entire mobile phone by using various interfaces and lines, and by running or executing a software program and/or module stored in the memory 120 and calling data stored in the memory 120, to perform various functions of the terminal 700 and process data, so as to perform overall monitoring on the mobile phone. Optionally, the processor 180 may include one or more processing cores. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 700 may further include a camera, a Bluetooth module, and the like, which are not further described herein. Specifically, in this embodiment, the display unit of the terminal is a touch screen display, the terminal further includes a memory, the storage medium storing at least one instruction, at least one program, and a code set or an instruction set, and the at least one instruction, the at least one program, and the code set or the instruction set being loaded and executed by the processor to implement the sticker presentation method in the foregoing embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of the embodiments of this application shall fall within the protection scope of the embodiments of this application.

What is claimed is:

1. A sticker presentation method, applied to a first terminal having one or more processors and memory storing programs to be executed by the one or more processors, the method comprising:
    displaying, by the first terminal, a group chat window between friends of a social networking application, the group chat window including a sticker selection window and a message presentation interface;
    obtaining, by the first terminal, a drag instruction for a selected target sticker in the sticker selection window;
    moving, by the first terminal, the target sticker from the sticker selection window to the message presentation interface according to an obtained drag track corresponding to the drag instruction;
    displaying, by the first terminal, a drop prompt in a process of moving the target sticker, wherein the drop prompt is displayed on a predefined portion of the target sticker;
    obtaining, by the first terminal, a drag stop instruction for the target sticker in the message presentation interface;
    in response to the drag stop instruction, presenting, by the first terminal, the target sticker at a first target location within the message presentation interface at which drag stops after receiving a drop confirmation instruction triggered by a user selection of the drop prompt, wherein the first target location is independent of a position of messages in the group chat window;
    controlling, by the first terminal, after obtaining a hiding presentation instruction for the target sticker, the target sticker to move from the first target location to a preset termination location according to a preset moving track; and
    adjusting, by the first terminal, transparency and a size of the target sticker in a moving process until presentation for the target sticker is canceled,
    wherein the target sticker is getting smaller and becoming more transparent when it is closer to the preset termination location.

2. The method according to claim 1, further comprising:
    obtaining, by the first terminal, after obtaining a scaling instruction for the target sticker, a target scaling ratio matching the scaling instruction; and
    performing, by the first terminal, scaling processing on the target sticker according to the target scaling ratio, to obtain a scaled target sticker; and
    presenting the scaled target sticker at the first target location.

3. The method according to claim 1, further comprising:
    obtaining, by the first terminal, after obtaining a rotation instruction for the target sticker, a target rotation direction and a target rotation angle that match the rotation instruction; and
    performing, by the first terminal, rotation processing on the target sticker according to the target rotation direction and the target rotation angle, to obtain a rotated target sticker; and
    presenting the rotated target sticker at the first target location.

4. The method according to claim 1, wherein the message presentation interface comprises a visual rendering layer; and
    the presenting the target sticker at a first target location at which drag stops comprises:
    drawing the target sticker presented at the first target location on the visual rendering layer in a presentation manner of being dropped on a top layer if a message box body is presented at the first target location, so that the target sticker is presented on the message box body in a superposing manner; or
    drawing the target sticker presented at the first target location on the visual rendering layer in a presentation manner of being dropped on a top layer if a message box body is presented at the first target location, and another sticker is presented on the message box body in a superposing manner, so that the target sticker is presented on the another sticker in a superposing manner; or
    drawing the target sticker presented at the first target location on the visual rendering layer if the first target location is blank.

5. The method according to claim 1, further comprising:
    controlling, by the first terminal, after obtaining a hiding cancel instruction for the target sticker, the target sticker to move from the preset termination location to the first target location according to the preset moving track; and
    adjusting, by the first terminal, the transparency and the size of the target sticker in a moving process until the target sticker restores to an original size and original transparency,
    wherein the target sticker is getting larger and becoming less transparent when it is closer to the first target location.

6. The method according to claim 1, further comprising:
    obtaining, by the first terminal, first screen size information of the first terminal;
    determining, by the first terminal, at least one presentation element associated with the target sticker, the presentation element being a message box body and/or a sticker presented at the first target location;
    calculating, by the first terminal, first coordinate location information of the target sticker relative to the at least one presentation element; and
    sending, by the first terminal, sticker presentation data to a second terminal, so that the second terminal presents the target sticker according to the sticker presentation data, the sticker presentation data comprising at least the first coordinate location information, the first screen size information, and identification information of the at least one presentation element, a second user of the second terminal being located in a friend relation chain of a first user of the first terminal.

7. A first terminal comprising one or more processors, memory coupled to the one or more processors and a plurality of programs stored in the memory that, when executed by the one or more processors, cause the first terminal to perform a plurality of operations comprising:

displaying, by the first terminal, a group chat window between friends of a social networking application, the group chat window including a sticker selection window and a message presentation interface;

obtaining, by the first terminal, a drag instruction for a selected target sticker in the sticker selection window;

moving, by the first terminal, the target sticker from the sticker selection window to the message presentation interface according to an obtained drag track corresponding to the drag instruction;

displaying, by the first terminal, a drop prompt in a process of moving the target sticker, wherein the drop prompt is displayed on a predefined portion of the target sticker;

obtaining, by the first terminal, a drag stop instruction for the target sticker in the message presentation interface;

in response to the drag stop instruction, presenting, by the first terminal, the target sticker at a first target location within the message presentation interface at which drag stops after receiving a drop confirmation instruction triggered by a user selection of the drop prompt, wherein the first target location is independent of a position of messages in the group chat window;

controlling, by the first terminal, after obtaining a hiding presentation instruction for the target sticker, the target sticker to move from the first target location to a preset termination location according to a preset moving track; and adjusting, by the first terminal, transparency and a size of the target sticker in a moving process until presentation for the target sticker is canceled, wherein the target sticker is getting smaller and becoming more transparent when it is closer to the preset termination location.

8. The first terminal according to claim 7, wherein the plurality of operations further comprise:

obtaining, by the first terminal, after obtaining a scaling instruction for the target sticker, a target scaling ratio matching the scaling instruction; and performing, by the first terminal, scaling processing on the target sticker according to the target scaling ratio, to obtain a scaled target sticker; and presenting the scaled target sticker at the first target location.

9. The first terminal according to claim 7, wherein the plurality of operations further comprise:

obtaining, by the first terminal, after obtaining a rotation instruction for the target sticker, a target rotation direction and a target rotation angle that match the rotation instruction; and performing, by the first terminal, rotation processing on the target sticker according to the target rotation direction and the target rotation angle, to obtain a rotated target sticker; and presenting the rotated target sticker at the first target location.

10. The first terminal according to claim 7, wherein the message presentation interface comprises a visual rendering layer; and the presenting the target sticker at a first target location at which drag stops comprises:

drawing the target sticker presented at the first target location on the visual rendering layer in a presentation manner of being dropped on a top layer if a message box body is presented at the first target location, so that the target sticker is presented on the message box body in a superposing manner; or drawing the target sticker presented at the first target location on the visual rendering layer in a presentation manner of being dropped on a top layer if a message box body is presented at the first target location, and another sticker is presented on the message box body in a superposing manner, so that the target sticker is presented on the another sticker in a superposing manner; or drawing the target sticker presented at the first target location on the visual rendering layer if the first target location is blank.

11. The first terminal according to claim 7, wherein the plurality of operations further comprise:

controlling, by the first terminal, after obtaining a hiding cancel instruction for the target sticker, the target sticker to move from the preset termination location to the first target location according to the preset moving track; and adjusting, by the first terminal, the transparency and the size of the target sticker in a moving process until the target sticker restores to an original size and original transparency, wherein the target sticker is getting larger and becoming less transparent when it is closer to the first target location.

12. The first terminal according to claim 7, wherein the plurality of operations further comprise:

obtaining, by the first terminal, first screen size information of the first terminal;

determining, by the first terminal, at least one presentation element associated with the target sticker, the presentation element being a message box body and/or a sticker presented at the first target location;

calculating, by the first terminal, first coordinate location information of the target sticker relative to the at least one presentation element; and sending, by the first terminal, sticker presentation data to a second terminal, so that the second terminal presents the target sticker according to the sticker presentation data, the sticker presentation data comprising at least the first coordinate location information, the first screen size information, and identification information of the at least one presentation element, a second user of the second terminal being located in a friend relation chain of a first user of the first terminal.

13. A non-transitory computer readable storage medium storing a plurality of machine readable instructions in connection with a first terminal having one or more processors, wherein the plurality of machine readable instructions, when executed by the one or more processors, cause the first terminal to perform a plurality of operations including:

displaying, by the first terminal, a group chat window between friends of a social networking application, the group chat window including a sticker selection window and a message presentation interface;

obtaining, by the first terminal, a drag instruction for a selected target sticker in the sticker selection window;

moving, by the first terminal, the target sticker from the sticker selection window to the message presentation interface according to an obtained drag track corresponding to the drag instruction;

displaying, by the first terminal, a drop prompt in a process of moving the target sticker, wherein the drop prompt is displayed on a predefined portion of the target sticker;

obtaining, by the first terminal, a drag stop instruction for the target sticker in the message presentation interface;

in response to the drag stop instruction, presenting, by the first terminal, the target sticker at a first target location within the message presentation interface at which drag stops after receiving a drop confirmation instruction triggered by a user selection of the drop prompt, wherein the first target location is independent of a position of messages in the group chat window;

controlling, by the first terminal, after obtaining a hiding presentation instruction for the target sticker, the target sticker to move from the first target location to a preset termination location according to a preset moving track; and adjusting, by the first terminal, transparency and a size of the target sticker in a moving process until presentation for the target sticker is canceled, wherein the target sticker is getting smaller and becoming more transparent when it is closer to the preset termination location.

14. The non-transitory computer readable storage medium according to claim 13, wherein the plurality of operations further comprise:

obtaining, by the first terminal, after obtaining a scaling instruction for the target sticker, a target scaling ratio matching the scaling instruction; and performing, by the first terminal, scaling processing on the target sticker according to the target scaling ratio, to obtain a scaled target sticker; and presenting the scaled target sticker at the first target location.

15. The non-transitory computer readable storage medium according to claim 13, wherein the plurality of operations further comprise:

obtaining, by the first terminal, after obtaining a rotation instruction for the target sticker, a target rotation direction and a target rotation angle that match the rotation instruction; and performing, by the first terminal, rotation processing on the target sticker according to the target rotation direction and the target rotation angle, to obtain a rotated target sticker; and presenting the rotated target sticker at the first target location.

16. The non-transitory computer readable storage medium according to claim 13, wherein the message presentation interface comprises a visual rendering layer; and the presenting the target sticker at a first target location at which drag stops comprises:

drawing the target sticker presented at the first target location on the visual rendering layer in a presentation manner of being dropped on a top layer if a message box body is presented at the first target location, so that the target sticker is presented on the message box body in a superposing manner; or drawing the target sticker presented at the first target location on the visual rendering layer in a presentation manner of being dropped on a top layer if a message box body is presented at the first target location, and another sticker is presented on the message box body in a superposing manner, so that the target sticker is presented on the another sticker in a superposing manner; or drawing the target sticker presented at the first target location on the visual rendering layer if the first target location is blank.

17. The non-transitory computer readable storage medium according to claim 13, wherein the plurality of operations further comprise:

obtaining, by the first terminal, first screen size information of the first terminal;

determining, by the first terminal, at least one presentation element associated with the target sticker, the presentation element being a message box body and/or a sticker presented at the first target location;

calculating, by the first terminal, first coordinate location information of the target sticker relative to the at least one presentation element; and sending, by the first terminal, sticker presentation data to a second terminal, so that the second terminal presents the target sticker according to the sticker presentation data, the sticker presentation data comprising at least the first coordinate location information, the first screen size information, and identification information of the at least one presentation element, a second user of the second terminal being located in a friend relation chain of a first user of the first terminal.

18. The non-transitory computer readable storage medium according to claim 13, wherein the plurality of operations further comprise:

controlling, by the first terminal, after obtaining a hiding cancel instruction for the target sticker, the target sticker to move from the preset termination location to the first target location according to the preset moving track; and adjusting, by the first terminal, the transparency and the size of the target sticker in a moving process until the target sticker restores to an original size and original transparency, wherein the target sticker is getting larger and becoming less transparent when it is closer to the first target location.

* * * * *